US011172527B2

(12) United States Patent
Naveh et al.

(10) Patent No.: US 11,172,527 B2
(45) Date of Patent: Nov. 9, 2021

(54) ROUTING OF COMMUNICATIONS TO A DEVICE

(71) Applicant: Amazon Technologies, Inc., Seattle, WA (US)

(72) Inventors: Dor Naveh, Seattle, WA (US); Arunjeet Singh, Redmond, WA (US); Adrian Hurditch, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/888,974

(22) Filed: Jun. 1, 2020

(65) Prior Publication Data

US 2020/0296784 A1    Sep. 17, 2020

Related U.S. Application Data

(62) Division of application No. 15/695,990, filed on Sep. 5, 2017, now Pat. No. 10,674,552.

(51) Int. Cl.
*H04W 76/14* (2018.01)
*H04M 3/42* (2006.01)
(Continued)

(52) U.S. Cl.
CPC ....... *H04W 76/14* (2018.02); *H04M 3/42042* (2013.01); *G06F 3/167* (2013.01);
(Continued)

(58) Field of Classification Search
CPC ....... H04W 4/02; H04W 4/029; H04W 4/023; H04W 4/16; H04W 40/20; H04W 4/80; H04W 4/021; H04W 84/045; H04W 76/10; H04W 84/18; H04W 8/24; H04W 60/04; H04W 8/18; H04W 4/027; H04W 4/14; H04W 64/003; H04W 88/02; H04W 88/04; H04W 92/02; H04W 92/18; H04W 12/02; H04W 64/00; H04W 4/00; H04W 4/025; H04W 52/0225; H04W 52/0254;
(Continued)

(56) References Cited

U.S. PATENT DOCUMENTS

| 7,656,889 B2 * | 2/2010 | Jeon | H04M 3/42212 370/428 |
| 2004/0017788 A1 * | 1/2004 | Shmueli | H04L 67/303 370/328 |

(Continued)

*Primary Examiner* — Kwasi Karikari
(74) *Attorney, Agent, or Firm* — Polsinelli PC

(57) ABSTRACT

Using a method of operating a system that includes remote servers, multiple electronic devices, and a wireless portable, the portable wireless device receives notification of an incoming call. The system uses the remote servers and other parts of the system to determine that one of the electronic devices can wirelessly communicate with the portable wireless device, and establishes a wireless connection between the portable wireless device and that device. The system determines whether the user is also located with the portable wireless device and wirelessly connected device and if so, routes incoming call audio to that device. If the system determines that the user is located with a different device, incoming call audio is routed from the portable wireless device to the device near the portable wireless device, and then the call audio is bridged to the device near the user.

20 Claims, 20 Drawing Sheets

(51) Int. Cl.
*H04W 88/04* (2009.01)
*H04W 84/12* (2009.01)
*G06F 3/16* (2006.01)
*H04W 4/80* (2018.01)

(52) U.S. Cl.
CPC .............. *H04W 4/80* (2018.02); *H04W 84/12* (2013.01); *H04W 88/04* (2013.01)

(58) Field of Classification Search
CPC ..... H04W 68/00; H04W 68/12; H04W 76/15; H04W 76/19; H04W 84/12; H04W 8/08; H04M 3/42263; H04M 3/54; H04M 3/543; H04M 2242/30; H04M 2203/2094; H04M 3/42348; H04M 2203/2066; H04M 3/42229; H04M 3/42374; H04M 3/42365; H04M 3/436; H04M 1/006; H04M 11/045; H04M 1/2535; H04M 1/6505; H04M 1/7253; H04M 2242/14; H04M 2250/12; H04M 3/4288; H04M 2207/18; H04M 2250/02; H04M 3/42153; H04M 3/42212; H04M 7/0033; H04M 1/00; H04M 1/6091; H04M 1/72527; H04M 2203/158; H04M 3/02; H04M 3/42059; H04M 3/42068; H04M 3/4211; H04M 3/4217

See application file for complete search history.

(56) References Cited

U.S. PATENT DOCUMENTS

2016/0072955 A1\* 3/2016 Barkan ................. H04M 3/543
455/417
2019/0028996 A1\* 1/2019 Achamola ......... H04M 3/42263

\* cited by examiner

ROUTING OF COMMUNICATIONS TO A DEVICE

CROSS-REFERENCE TO RELATED APPLICATIONS

This application is a divisional of U.S. application Ser. No. 15/695,990, filed Sep. 5, 2017, which is hereby expressly incorporated herein by reference in its entirety.

BACKGROUND

A range of technologies can be used to facilitate communication. Those technologies include cell phones, voice over IP, and landline services. Some of those technologies rely on wired connections, and some rely on wireless connections. Some are relatively portable, others are relatively fixed.

BRIEF DESCRIPTION OF THE DRAWINGS

Various embodiments in accordance with the present disclosure will be described with reference to the drawings, in which.

Figure 1A:
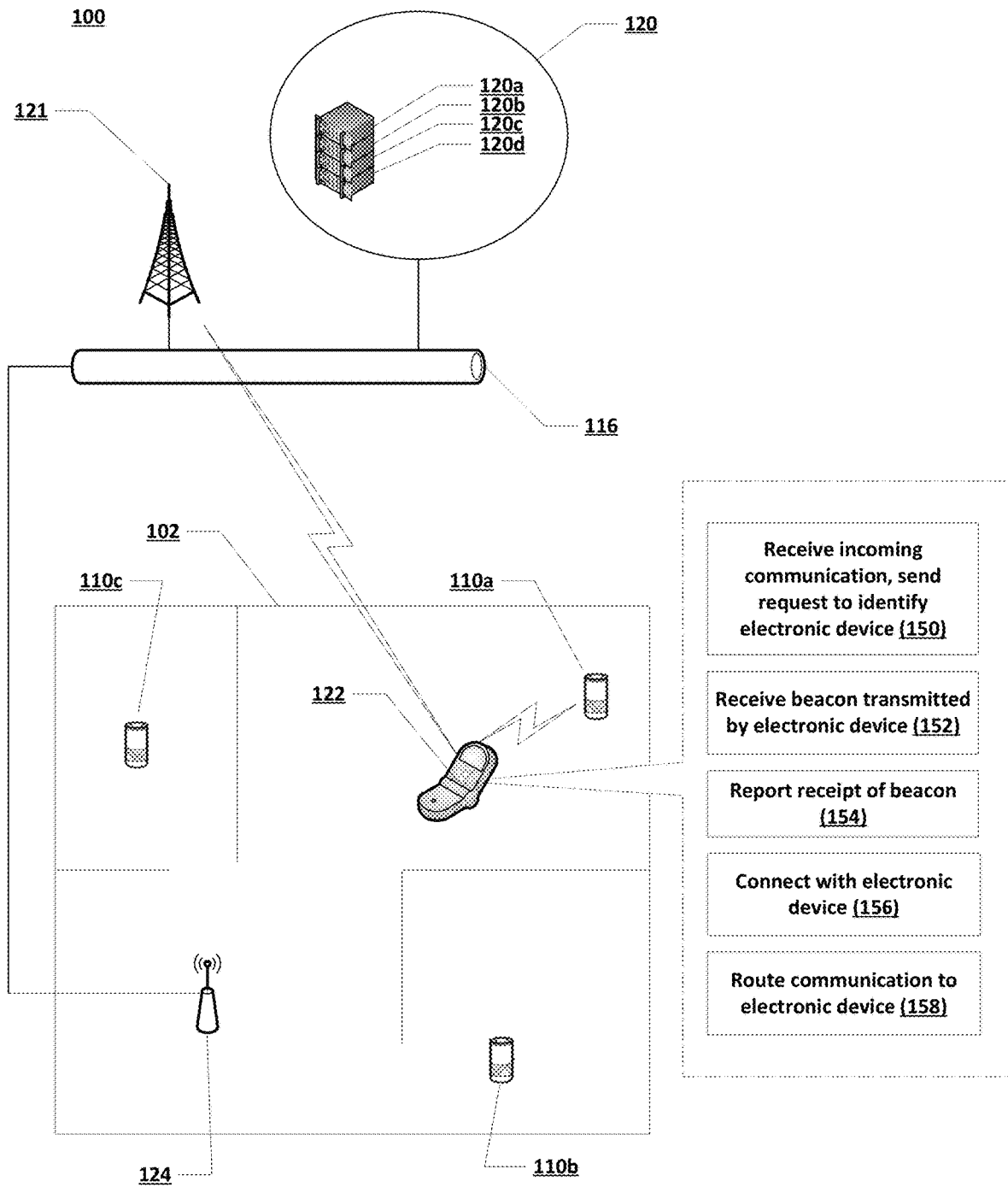
FIGS. 1A, 1B, 1C and 1D illustrate an architecture that includes multiple devices that are physically situated in environments to communicate over wired and wireless communication links, generate and capture audio, and respond to a user's audio commands.

While the disclosed technology is described herein by way of example for several embodiments and illustrative drawings, those skilled in the art will recognize that the disclosed technology is not limited to the embodiments or drawings described herein. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the words "can" or "may" are used in a permissive sense (i.e., meaning having the potential to), rather than the mandatory sense (i.e., meaning must). Similarly, the words "include", "including", and "includes" mean including, but not limited to.

DETAILED DESCRIPTION

A user may have electronic devices that perform speech processing and interpret voice commands, and may position those electronic devices in different locations of different environments where they work and live. The user may also have a portable wireless device, such as a mobile cellular telephone, that they use for communication. To make and receive communications, the user may want to connect their portable wireless device to one of those electronic devices. With multiple electronic devices, one question that arises is which electronic device should be used. Addition questions arise where the user is near one electronic device, and their portable wireless device is near a different electronic device. The implementations described herein illustrate some of the ways these multiple electronic devices can be used in combination with a portable wireless device for communication.

The user and portable wireless device may be located generally together, such as when the portable wireless device is in the user's hand, in the user's pocket, or in the user's purse. As the user moves through the user's home or other environment, where multiple electronic devices may be located in different rooms, the user and portable wireless device come into proximity of those electronic devices. When an incoming communication is received on the portable wireless device, the portable wireless device notifies the user with a notification, such as by ringing and/or vibrating and/or flashing. At the same time, an application on the portable wireless device that coordinates interaction with the electronic devices, communicates with remote servers and provides the computing servers with information about the incoming communication. The portable wireless device may also indicate, based on user preferences, that if the user is near one of their electronic devices, the user prefers to have one of those electronic devices respond to the communication based on spoken commands from the user, and then use the electronic device for the communication.

To determine which electronic device should connect with the portable wireless device, the remote computing servers first determine which of the multiple electronic devices is suitable for the communication. If one of the electronic devices is in the same room or otherwise near the portable wireless device, that electronic device may be suitable for the communication. Then the remote servers determine whether that same electronic device or a different electronic device is also in the vicinity of the user.

Determining which electronic device is suitable for the communication can be accomplished with wireless radio frequency beacon transmissions. In one implementation, the remote servers determine that a portable wireless device associated with a user has an incoming communication. Using that information, the remote servers send commands to electronic devices associated with that user. Those commands cause the associated electronic devices to activate wireless beacon transmissions. The remote servers also inform the portable wireless device that wireless beacon transmissions are being transmitted, and that the portable wireless device should report receipt of any of those wireless beacon transmissions.

Wireless beacon transmissions, particularly if they are BLUETOOTH beacons, have limited range. That limited range might cover a single room or two adjacent rooms separated by a wall. When the portable wireless device receives a BLUETOOTH beacon that was transmitted by one of the electronic devices, the two devices are likely to be within that limited range, and they may be in the same or adjacent rooms. The wireless beacon includes beacon data that can be used to identify the transmitting electronic device. The portable wireless device informs the remote servers that a wireless beacon was received, and includes the identifying beacon data. Using the identifying beacon data, the remote servers can determine which electronic device should be connected to the portable wireless device.

The remote servers send commands to the electronic device to provide a notification of the incoming communication, and prompt the user. For example, the notification might be: "You have a call coming in from Mrs. Smith. Do you want to answer the call?"

If the user is located in the same room with the electronic device that is announcing the incoming call, then the user should hear the prompt from the electronic device, and can respond accordingly.

Because the user may not be located in the same room as the portable wireless device, but may still be located near an electronic device that is associated with the user, the remote servers can send commands to all electronic devices associated with the user to verbally announce the incoming call, and prompt the user. The verbal announcement is generated using text-to-speech or synthesized speech, as described below. If the user is located near one of the electronic devices that is announcing the incoming call, then the user should hear the prompt, and can respond accordingly.

It is also possible that when the portable wireless device receives notification of an incoming call, the portable wireless device begins to transmit a wireless beacon that is associated with or can be received by electronic devices. The wireless beacon includes information identifying the portable wireless device. Electronic devices that are within the wireless transmission range of the portable wireless device beacon will receive it, and they report that receipt, along with the information identifying the portable wireless device, to the remote servers. The remote servers instruct the electronic device to verbally announce the incoming call, and prompt the user. If the user is located near the electronic device that received and reported the beacon from the portable wireless device, then the user will hear the prompt, and can respond accordingly.

Similar to the example above, because the user may not be located in the same room as the portable wireless device, but may still be located near an electronic device that is associated with the user, the remote servers can also send commands to all electronic devices associated with the user to verbally announce the incoming call, and prompt the user. If the user is located near one of the electronic devices that is announcing the incoming call, then the user should hear the prompt, and can respond accordingly.

It is also possible that instead of using wireless beacons to determine which electronic device is near the portable wireless device, the portable wireless device can inform the remote servers of the incoming call. The remote servers can send commands to all electronic devices associated with the user to verbally announce the incoming call, and prompt the user. If the user is located near one of the electronic devices that is announcing the incoming call, then the user should hear the prompt, and can respond accordingly. Because the portable wireless device may not be located in the same room with the user, the call may be routed from the portable wireless device to the remote servers, and then from the remote servers to the electronic device that is with the user.

These examples and others are described in greater detail below with reference to the accompanying FIGS.

Figure 1B:
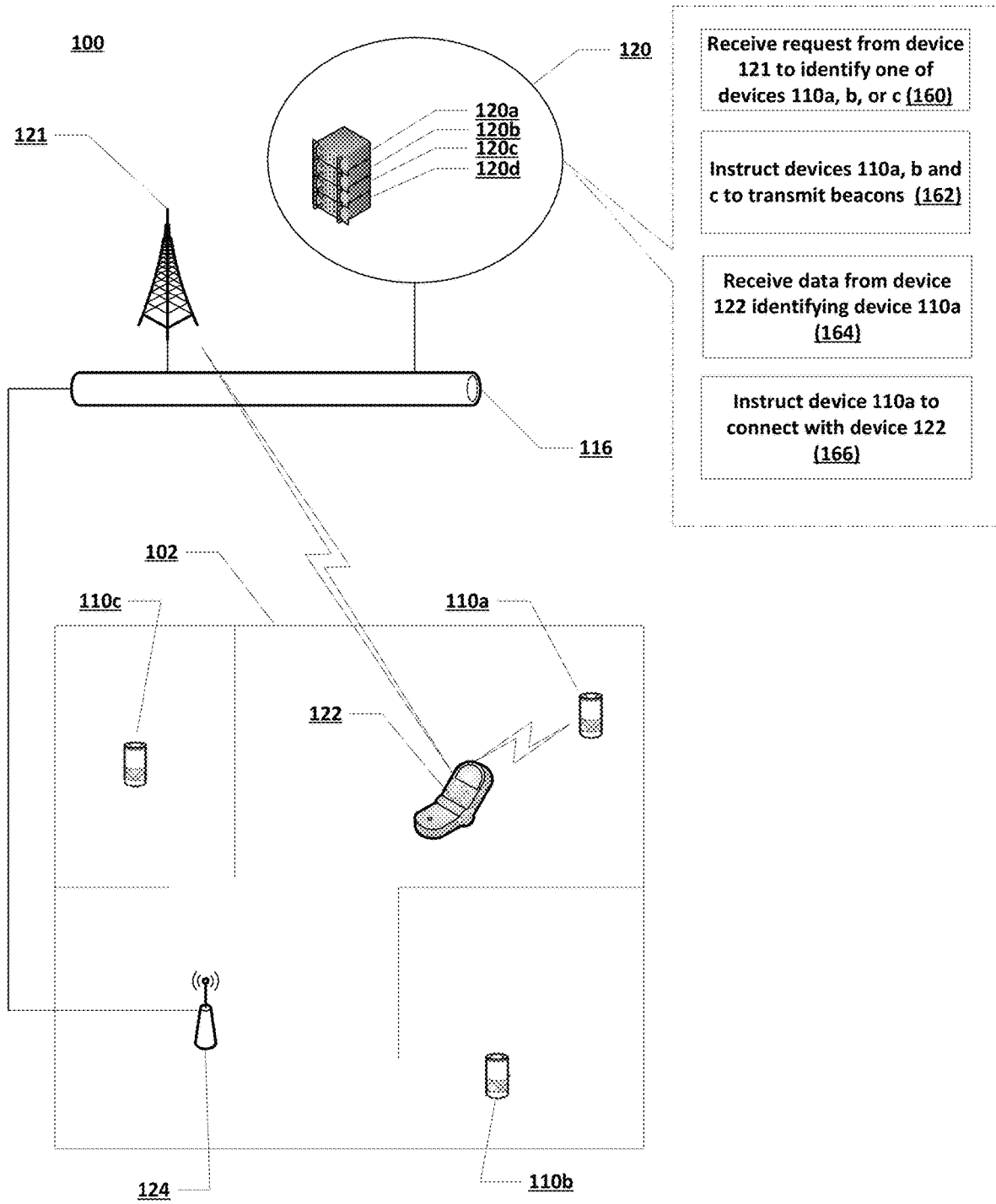
Figure 1C:
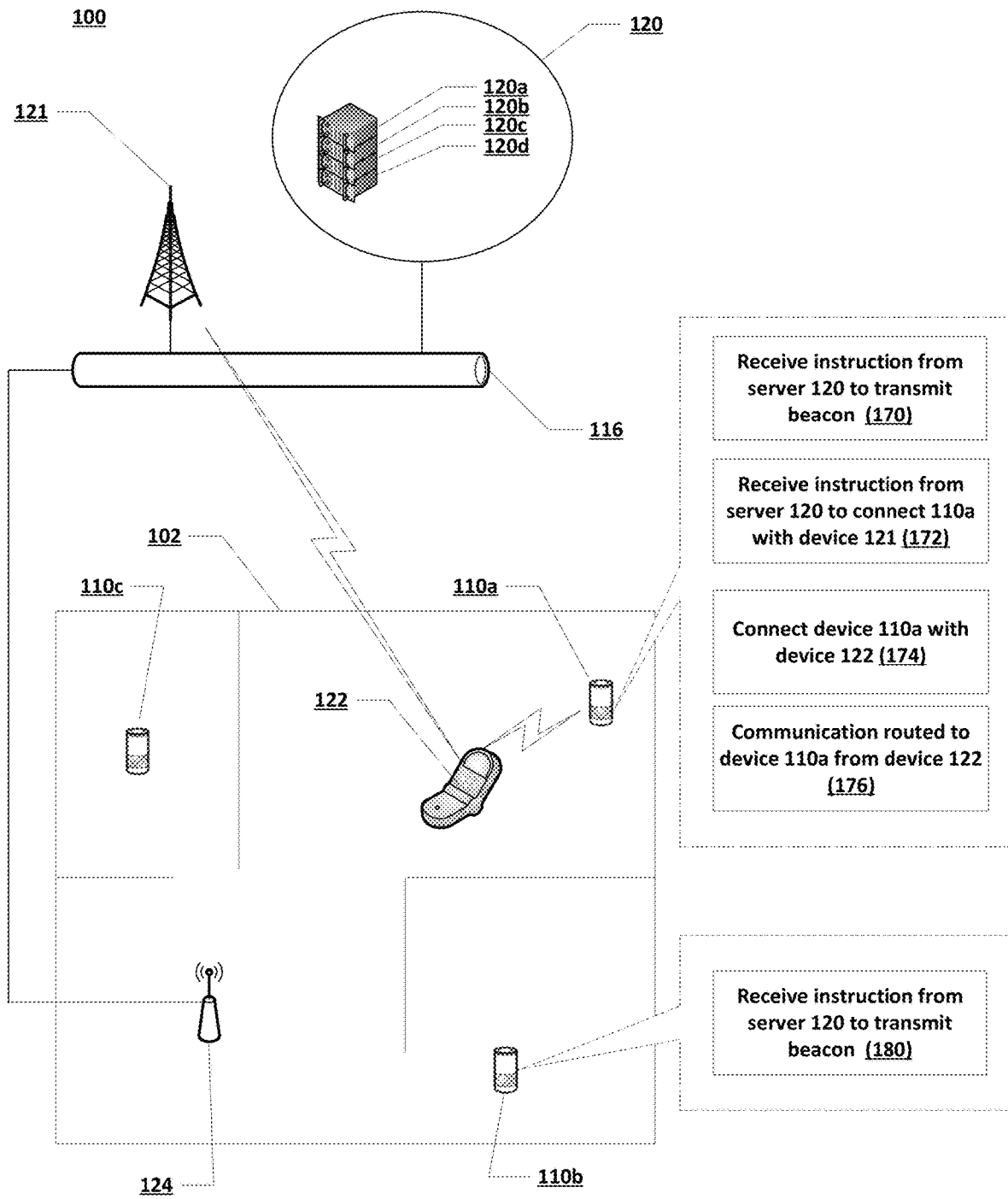

FIGS. 1A, 1B and 1C show an illustrative voice interaction computing architecture 100 set in environment 102. The architecture 100 also includes one or more electronic devices 110 with which a user may interact. As illustrated, one electronic device 110a is positioned within a room of environment 102. Other electronic devices 110b and 110c are positioned in adjacent rooms of environment 102. Environment 102 might be the environment of the user's home.

Electronic device 110 may be placed in any number of locations (e.g., ceiling, wall, in a lamp, beneath a table, under a chair, etc.). Further, more than one electronic device 110 may be positioned in a single room, or as illustrated electronic devices may be used to accommodate user interactions from more than one room.

Figure 1D:
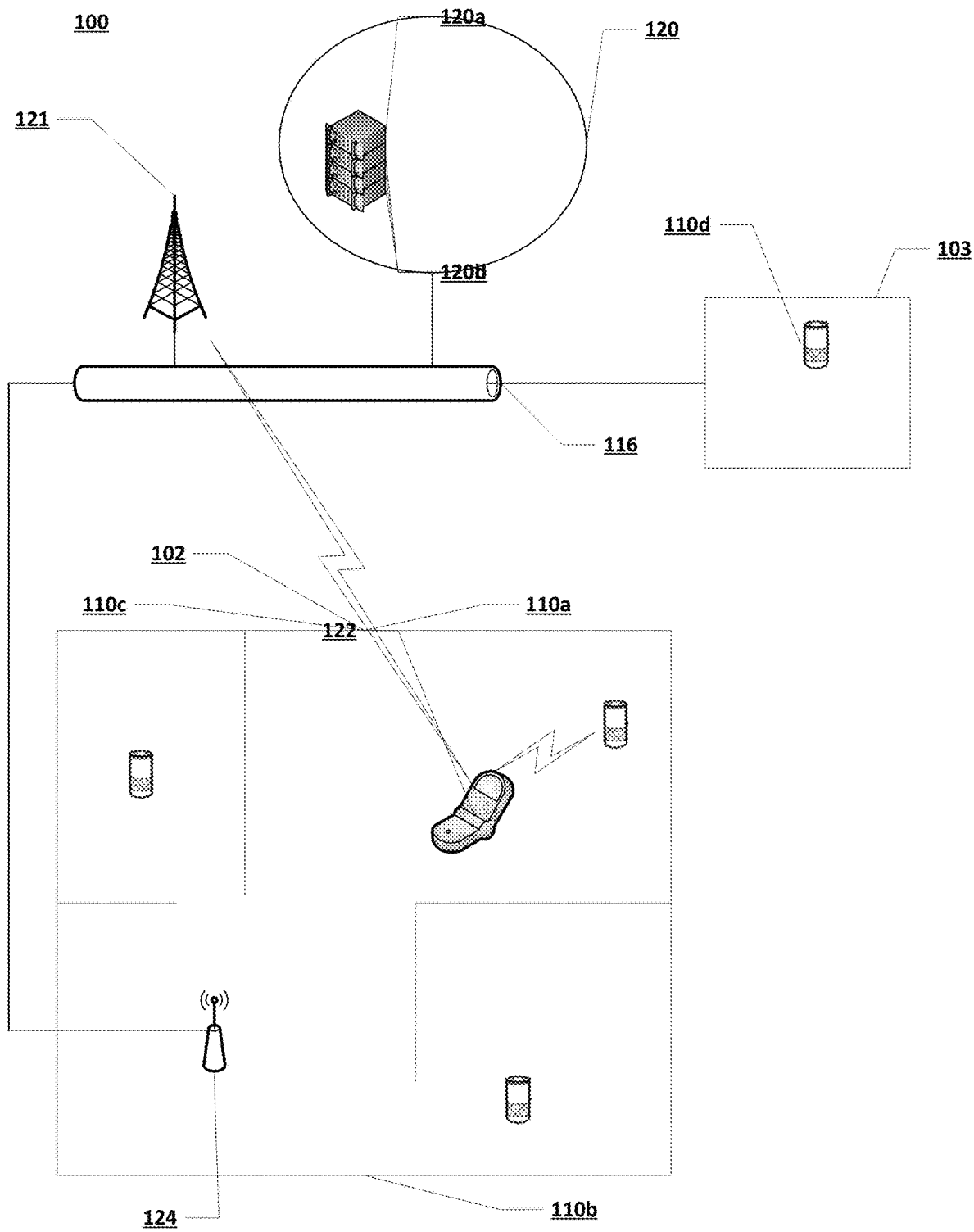

As described below in greater detail, electronic device 110 may communicate using wireless, such as Wi-Fi (IEEE 802.11), and/or BLUETOOTH (IEEE 802.15.1), and/or ZIGBEE (IEEE 802.15.4). These wireless technologies provide point-to-point communication between two endpoints. Electronic device 110 is one endpoint of the point-to-point communication, and portable wireless device 122 is another endpoint of the point-to-point communication. When communicating using Wi-Fi, electronic device 110 may connect with wireless access point 124, and wireless access point 124 may connect to the Internet using network 116. Portable wireless device 122 may also connect to wireless access point 124. In some implementations, portable wireless device 122 is a cellular portable wireless device, although it does not need to be a portable wireless device, and could be a tablet, or other device with wireless capability. Within environment 102, any or all of electronic devices 110a, 110b and 110c may connect with wireless access point 124. As illustrated in FIG. 1D, within environment 103, electronic device 110d may also connect with network 116 and the Internet using a wireless access point (not illustrated) or using a wired connection to network 116. For shorter-range wireless communication, electronic device 110 may also use a BLUETOOTH connection with portable wireless device 122.

FIG. 1D shows an illustrative voice interaction computing architecture 100 set in environment 102 and environment 103. The architecture 100 also includes one or more electronic devices 110 with which a user may interact. As illustrated, one electronic device 110a is positioned within a room of environment 102. Other electronic devices 110b and 110c are positioned in adjacent rooms of environment 102. Another electronic device 110d is positioned in a room of a different environment 103. As illustrated, environment 102 might be the environment of the user's home, while environment 103 might be the environment of the user's office.

Referring to system 100 in FIGS. 1A, 1B and 1C, at (150) portable wireless device 122 receives an incoming communication, and sends a request to remote server(s) 120 to identify an electronic device 110. At (160), remote server(s) 120 receive the request to identify an electronic device, and at (162) remote server(s) 120 instructs electronic devices 110a and 110b to transmit beacons. At (170), electronic device 110a receives the command to transmit a beacon. At (180), electronic device 110b receives the command to transmit a beacon. At (152), portable wireless device 122 receives the beacon transmitted by electronic device 110a, and at (154) reports receipt of that beacon to remote server(s) 120. At (164), remote server(s) 120 receives data from portable wireless device 122 that identifies electronic device 110a as the beacon transmitter. At (166), remote server(s) 120 instructs electronic device 110a to connect with portable wireless device 122. At (174) electronic device 110a receives the command to connect with portable wireless device 122, and at (156) portable wireless device 122 receives the command to connect with electronic device 110a. At (158), the communication is routed from portable wireless device 122 to electronic device 110a using the connection, and at (176) electronic device 110a receives the routed communication from portable wireless device 122.

Figure 2:
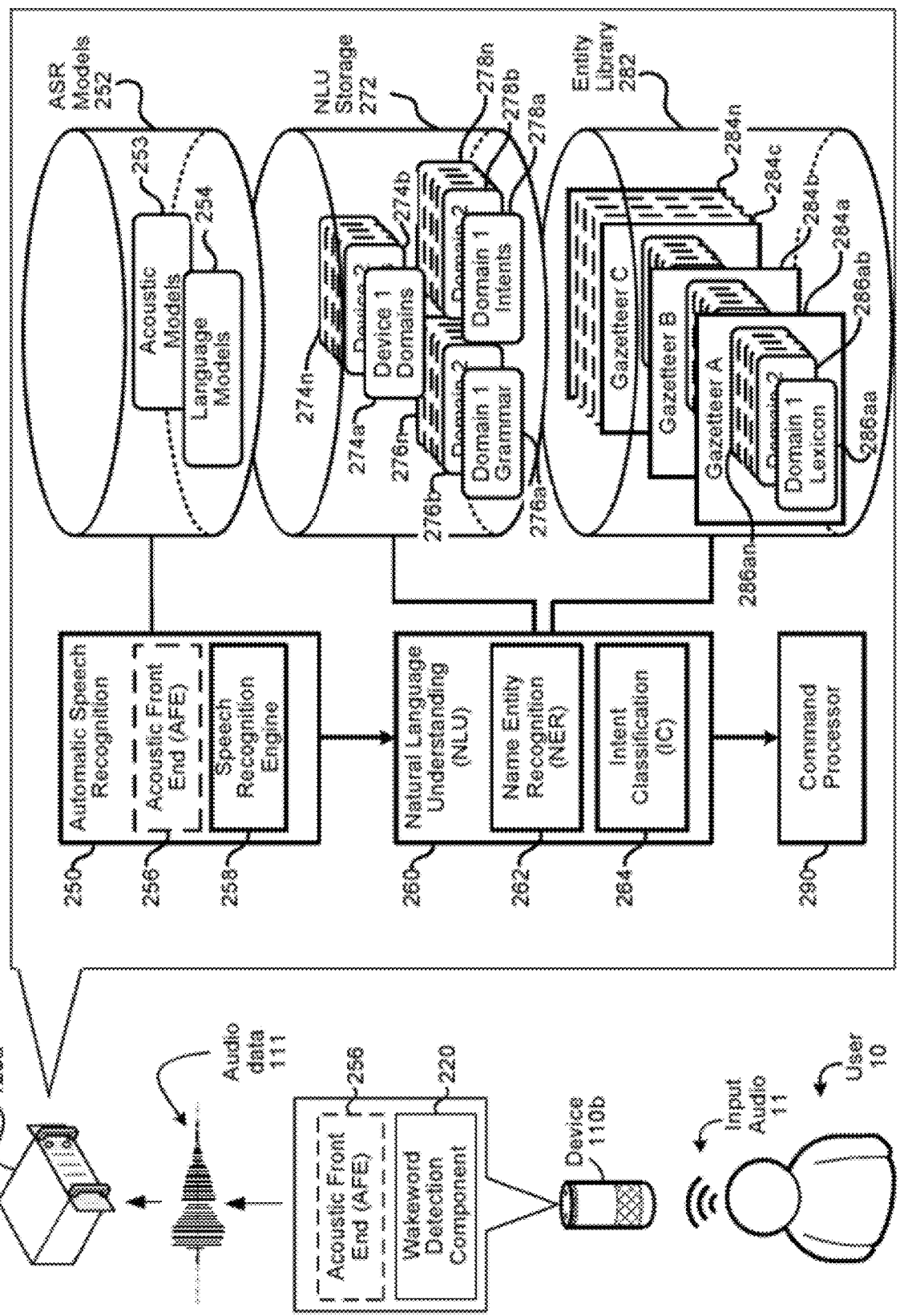
FIG. 2 illustrates an architecture for processing a spoken utterance.

The system 100 of FIG. 1 may operate using various speech processing components as described in FIG. 2. FIG. 2 is a conceptual diagram of how a spoken utterance is processed, allowing a system to capture and execute commands spoken by a user, such as spoken commands that may follow a wakeword. The various components illustrated may be located on a same or different physical devices. Communication between various components illustrated in FIG. 2 may occur directly or across network(s) 116. An audio capture component, such as microphone(s) 112 of device 110, captures audio 11 corresponding to a spoken utterance.

The device 110, using a wakeword detection component 220, then processes the audio 11, or audio data 111 corresponding to the audio 11, to determine if a keyword (such as a wakeword) is detected in the audio 11. Following detection of a wakeword, the device sends audio data 111 corresponding to the utterance, to a server(s) 120a that includes an ASR component 250. The audio data 111 may be output from an acoustic front end (AFE) 256 located on the device 110 prior to transmission. Or the audio data 111 may be in a different form for processing by a remote AFE 256.

The wakeword detection component 220 works in conjunction with other components of the device, for example microphone(s) 502 to detect keywords in audio 11. For example, the device 110 may convert audio 11 into audio data 111, and process the audio data 111 with the wakeword detection component 220 to determine whether speech is detected, and if so, if the audio data 111 comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 11 received by the device 110 (or separately from speech detection), the device 110 may use the wakeword detection component 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data 111 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120a for speech processing. Audio data 111 corresponding to that audio 11 may be sent to a server(s) 120b for routing to a recipient device or may be sent to the server(s) 120a for speech processing for interpretation of the included speech (either for purposes of enabling voice-communications and/or for purposes of executing a command in the speech). The audio data 111 may include data corresponding to the wakeword, or the portion of the audio data 111 corresponding to the wakeword may be removed by the local device 110 prior to sending. Further, a local device 110 may "wake" upon detection of speech/spoken audio above a threshold, as described herein. Upon receipt by the server(s) 120a, an ASR component 250 may convert the audio data 111 into text. The ASR transcribes audio data 111 into text data representing the words of the speech contained in the audio data 111. The text data may then be used by other components for various purposes, such as executing system commands, inputting data, etc. A spoken utterance in the audio data 111 is input to a processor configured to perform ASR which then interprets the utterance based on the similarity between the utterance and pre-established language models 254 stored in an ASR model knowledge base (ASR Models Storage 252). For example, the ASR process may compare the input audio data 111 with models for sounds (e.g., subword units, phonemes, etc.) and sequences of sounds to identify words that match the sequence of sounds spoken in the utterance of the audio data 111.

An ASR process 250 converts the audio data 111 into text. The ASR transcribes audio data 111 into text data representing the words of the speech contained in the audio data 111. The text data may then be used by other components for various purposes, such as executing system commands, inputting data, etc. A spoken utterance in the audio data 111 is input to a processor configured to perform ASR which then interprets the utterance based on the similarity between the utterance and pre-established language models 254 stored in an ASR model knowledge base (ASR Models Storage 252). For example, the ASR process may compare the input audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data 111. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data 111 from the microphone(s) 502 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values, called features, representing the qualities of the audio data 111, along with a set of those values, called a feature vector or audio feature vector, representing the features/qualities of the audio data 111 within the frame. Many different features may be determined, as known in the art, and each feature represents some quality of the audio 11 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage 252. Alternatively, post front-end processed data (such as feature vectors) may be received by the device executing ASR processing from another source besides the internal AFE 256. For example, the device 110 may process audio data 111 into feature vectors (for example using an on-device AFE 256) and transmit that information to a server across network(s) 116 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 116. For example, ASR results in the form of a single textual representation of the speech, an N-best list including multiple hypotheses and respective scores, lattice, etc. may be sent to a server, such as the server(s) 120a, for natural language understanding (NLU) processing, such as conversion of the text into commands for execution, either by the device 110, by the server(s) 120a, or by another device (such as a server running a search engine, etc.).

The device performing NLU processing 260 (e.g., server(s) 120a) may include various components, including potentially dedicated processor(s), memory, storage, etc. A device configured for NLU processing 260 may include a named entity recognition (NER) component 262, intent classification (IC) component 264, NLU storage 272 and a knowledge base (not shown). The knowledge base is a database or other information storage that may include information about entities that may be used in resolving user queries. The NLU process may also utilize gazetteer information (284a-284n) stored in entity library storage 282. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 260 takes textual input (such as processed from ASR 250 based on the utterance 11) and attempts to make a semantic interpretation of the text. That is, the NLU process 260 determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process 260 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server(s) 120a or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition component 262 receives a query in the form of ASR results and attempts to identify relevant grammars and lexical information that may be used to construe meaning. To do so, a name entity recognition component 262 may begin by identifying potential domains that may relate to the received query. The NLU storage 272 includes a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

In some examples, the device 110 may determine contextual information to assist with performing speech processing, such as a domain, based on the process operating when a voice command is received. For example, the device 110 may associate a first domain with a first feature group. When the device 110 receives a voice command while operating a first process corresponding to the first feature group, the device 110 may generate contextual information that indicates the first domain and/or other information and may associate the contextual information with the voice command.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) component 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC component 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the query to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (in the NLU's storage 272). For instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the voice-controlled device "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server(s) 120a as part of the system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search query (for example, requesting the return of search results), the destination command processor 290 may include a search engine processor, such as one located on a search server, configured to execute a search command and determine search results, which may include output text to be processed by a TTS engine and output from a device as synthesized speech, such as announcements made with the pages described above.

Figure 3:
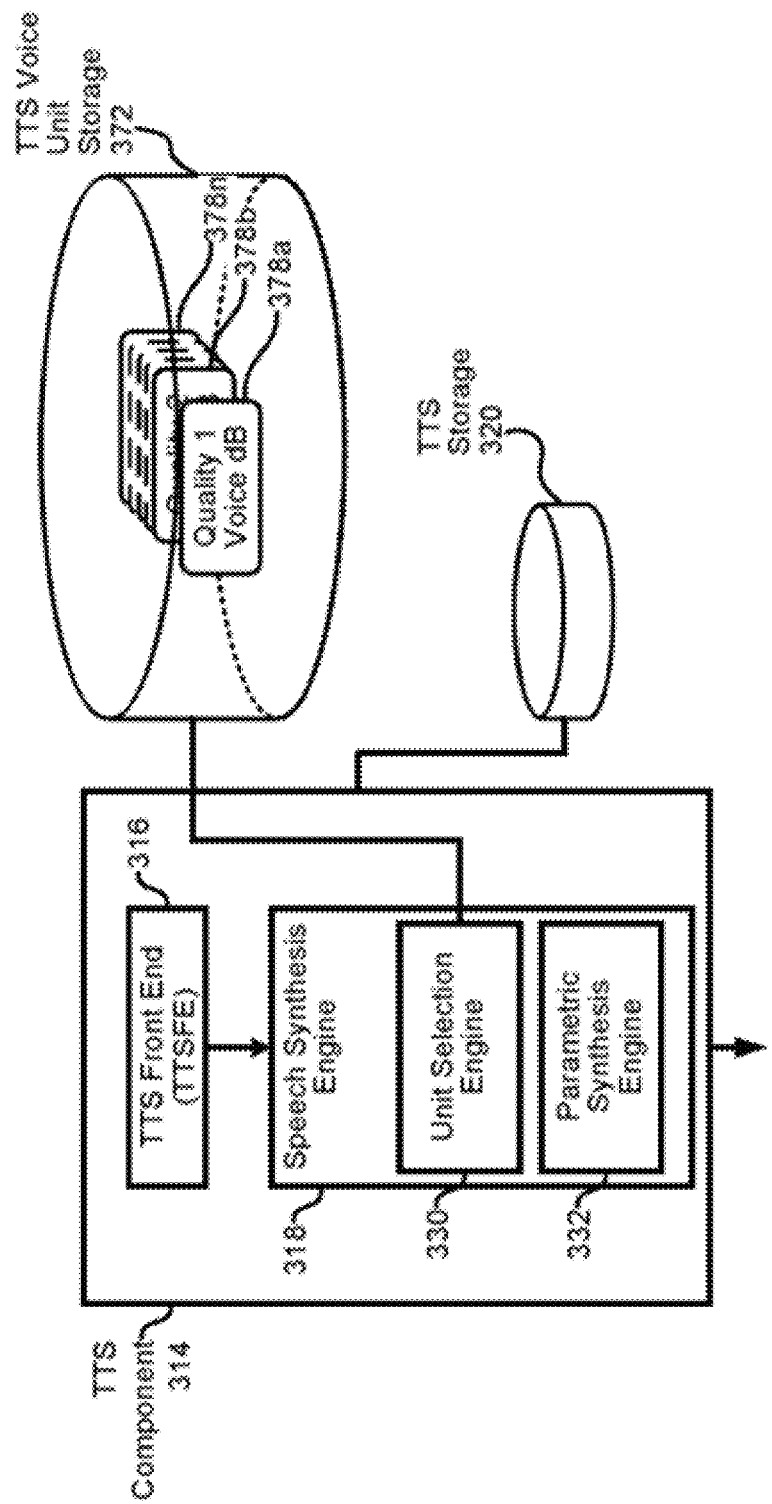
FIG. 3 illustrates examples of generating speech from text, or synthesized speech.

FIG. 3 illustrates an example of generating text-to-speech (TTS) or synthesized speech according to examples of the present disclosure. The TTS component/processor 314 includes a TTS front end (TTSFE) 316, a speech synthesis engine 318, and TTS storage 320. The TTSFE 316 transforms input text data (for example from command processor 290) into a symbolic linguistic representation for processing by the speech synthesis engine 318. The TTSFE 316 may also process tags or other data input to the TTS component that indicate how specific words should be pronounced (e.g., an indication that a word is an interjection). The speech synthesis engine 318 compares the annotated phonetic units models and information stored in the TTS storage 320 for converting the input text into speech. The TTSFE 316 and speech synthesis engine 318 may include their own controller(s)/processor(s) and memory or they may use the controller/processor and memory 604 of the server(s) 120a, device 110, or other device, for example. Similarly, the instructions for operating the TTSFE 316 and speech synthesis engine 318 may be located within the TTS component 314, within the memory and/or storage of the server(s) 120a, device 110, or within an external device.

Text input into a TTS component 314 may be sent to the TTSFE 316 for processing. The front-end may include components for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 316 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS component 314 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 320. The linguistic analysis performed by the TTSFE 316 may also identify different grammatical components such as prefixes, suffixes, phrases, punctuation, syntactic boundaries, or the like. Such grammatical components may be used by the TTS component 314 to craft a natural sounding audio waveform output. The language dictionary may also include letter-to-sound rules and other tools that may be used to pronounce previously unidentified words or letter combinations that may be encountered by the TTS component 314. Generally, the more information included in the language dictionary, the higher quality the speech output.

Based on the linguistic analysis the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text input to the TTS component 314. Such acoustic features may include pitch, energy, duration, and the like. Application of acoustic features may be based on prosodic models available to the TTS component 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information.

The output of the TTSFE 316, referred to as a symbolic linguistic representation, may include a sequence of phonetic units annotated with prosodic characteristics. This symbolic linguistic representation may be sent to a speech synthesis engine 318, also known as a synthesizer, for conversion into an audio waveform of speech for output to an audio output device and eventually to a user. The speech synthesis engine 318 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 330 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis, parameters such as frequency, volume, noise, are varied by a parametric synthesis engine 332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS component 314 may include an acoustic model, or other models, which may convert a symbolic linguistic representation into a synthetic acoustic waveform of the text input based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 318, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (ID), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First a unit selection engine 330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 330. As part of unit selection, the unit selection engine 330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 320, in storage 312, or in another storage component. For example, different unit selection databases may be stored in TTS voice unit storage 372. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 318 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Audio waveforms including the speech output from the TTS component 314 may be sent to an audio output component, such as a speaker for playback to a user or may be sent for transmission to another device, such as another server(s) 120a/120b, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS component 314 may be configured to perform TTS processing in multiple languages. For each language, the TTS component 314 may include specially configured data, instructions and/or components to synthesize speech in the desired language(s). To improve performance, the TTS component 314 may revise/update the contents of the TTS storage 320 based on feedback of the results of TTS processing, thus enabling the TTS component 314 to improve speech recognition.

Other information may also be stored in the TTS storage 320 for use in speech recognition. The contents of the TTS storage 320 may be prepared for general TTS use or may be customized to include sounds and words that are likely to be used in a particular application. For example, for TTS processing by a global positioning system (GPS) device, the TTS storage 320 may include customized speech specific to location and navigation. In certain instances the TTS storage 320 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 318 may include specialized databases or models to account for such user preferences.

For example, to create the customized speech output of the system, the system may be configured with multiple voice corpuses/unit databases 378a-378n, where each unit database is configured with a different "voice" to match desired speech qualities. The voice selected by the TTS component 314 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 378 may then be used during runtime to perform unit selection to synthesize speech having a speech quality corresponding to the input speech quality.

Figure 4:
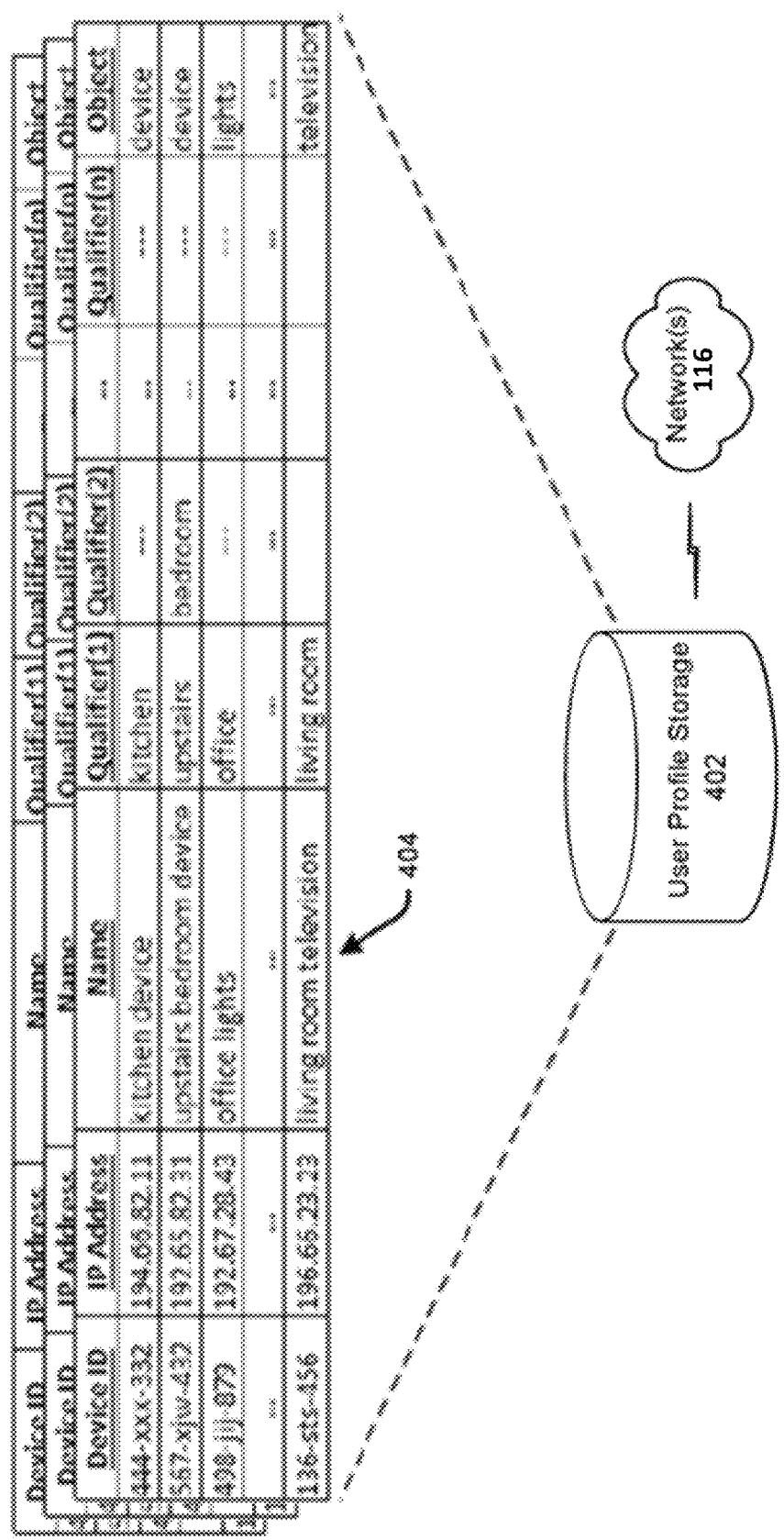
FIG. 4 illustrates examples of data stored and associated with user profiles.

The server(s) 120a/120b may include or refer to data regarding user accounts, shown by the user profile storage 402 illustrated in FIG. 4. The user profile storage 402 may be located proximate to server(s) 120a/120b, or may otherwise be in communication with various components, for example over network(s) 116. The user profile storage 402 may include a variety of information related to individual users, households, accounts, etc. that interact with the system 100. For illustration, as shown in FIG. 4, the user profile storage 402 may include data regarding the devices associated with particular individual user accounts 404. In an example, the user profile storage 402 is a cloud-based storage. Such data may include device identifier (ID) and internet protocol (IP) address information for different devices as well as names by which the devices may be referred to by a user. Further qualifiers describing the devices may also be listed along with a description of the type of object of the device.

Figure 5:
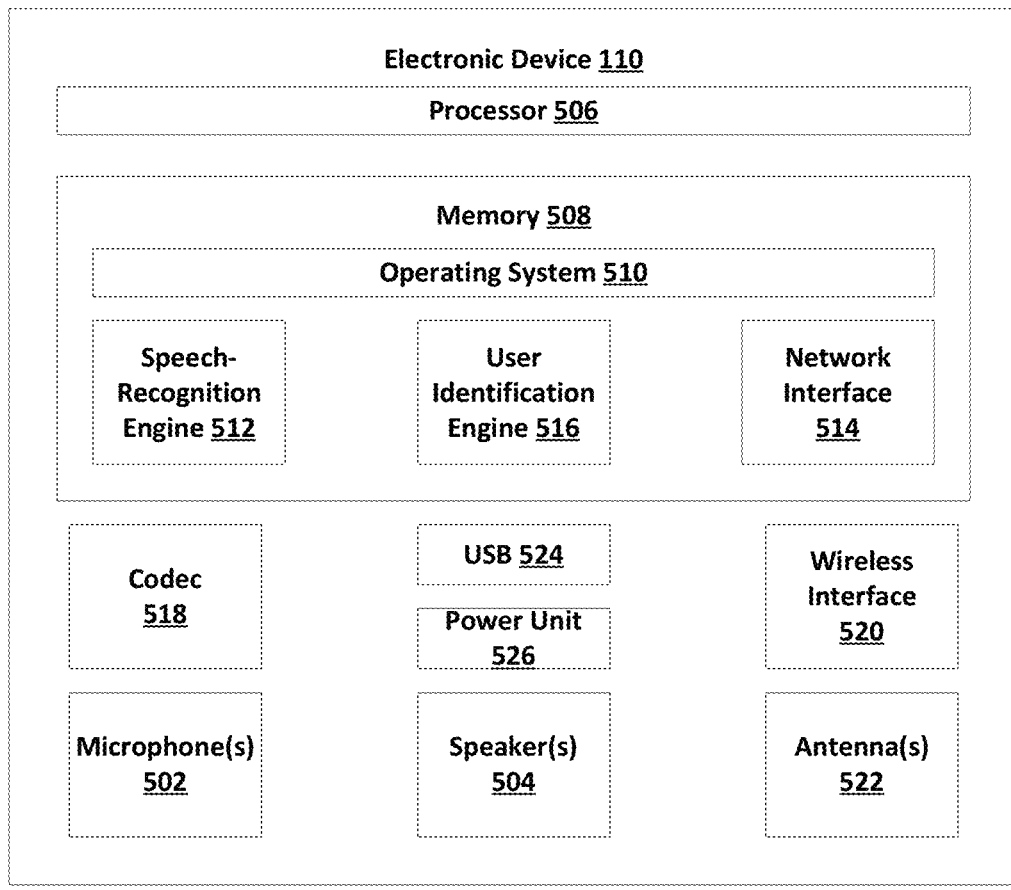
FIG. 5 illustrates a block diagram of selected functional components implemented in an electronic device.

As illustrated with respect to FIG. 5, electronic device 110 generally has at least one microphone 502 and at least one speaker 504 to facilitate user audio interactions. In some instances, electronic device 110 is implemented without physical input components (e.g., no keyboard, no keypad, no touch screen, no joystick, no control buttons, etc.). In some instances, a limited set of one or more physical input components may be employed (e.g., a dedicated button to initiate a configuration, power on/off, or a touch screen display, etc.). Nonetheless, a primary and potentially only mode of user interaction with electronic device 110 may be through voice input and audible output.

Microphone 502 of electronic device 110 detects audio from an environment 102 or 103, such as sounds uttered from a user. As illustrated, the electronic device 110 includes at least one processor 506 and memory 508, which stores or otherwise has access to a speech-recognition engine 512. As used herein, a processor may include multiple processors and/or a processor having multiple cores. The speech-recognition engine 512 performs speech recognition on audio captured by microphone 502, such as utterances spoken by a user. The electronic device 110 may perform certain actions in response to recognizing different speech from a user. The user may speak predefined commands (e.g., "Awake"; "Sleep"), or may use a more casual conversation style when interacting with electronic device 110 (e.g., "I'd like to go to a movie. Please tell me what's playing at the local cinema.").

In some instances, electronic device 110 may operate in conjunction with or may otherwise utilize remote server(s) 120 that are remote from environments 102 and/or 103. For instance, electronic device 110 may couple to the remote server(s) 120 over network 116. As illustrated, the remote server(s) 120 may be implemented as one or more servers 120a, 120b, 120c, 120d, and may, in some instances form a portion of a network-accessible computing platform implemented as a computing infrastructure of processors, storage, software, data access, and so forth that is maintained and accessible via a network such as one including the Internet. The remote server(s) 120 do not require end-user knowledge of the physical location and configuration of the system that delivers the services.

Figure 6:
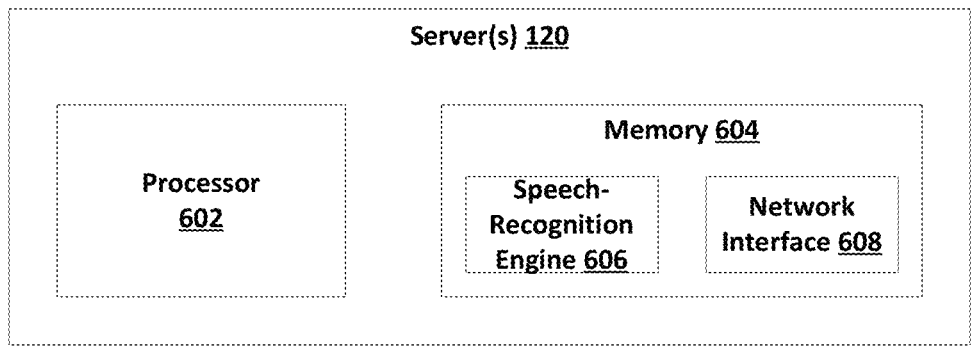
FIG. 6 illustrates a block diagram of selected functional components implemented in the remote servers.

As illustrated in FIG. 6, servers 120a-120d include at least one processor 602 and memory 604, which may store or otherwise have access to some or all of the components described with reference to memory 508 of the electronic device 110. For instance, memory 604 may have access to and utilize speech-recognition engine 512 or another speech recognition engine 606 for receiving audio signals from the electronic device 110, recognizing speech and, potentially, causing performance of an action in response. In some examples, the electronic device 110 may upload audio data to the remote server(s) 120 for processing, given that the remote server(s) 120 may have a computational capacity that far exceeds the computational capacity of the electronic device 110. Therefore, the electronic device 110 may utilize the speech-recognition engine 606 at the remote server(s) 120 for performing relatively complex analysis on audio captured from environments 102 or 103.

Regardless of whether the speech recognition occurs locally or remotely from the environments 102 or 103, the electronic device 110 may receive vocal input from a user and either the electronic device 110 and/or the remote server(s) 120 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, telephone communication, and so forth.

The electronic device 110 and the remote server(s) 120 may communicatively couple to the network 116 via network interface 514 and network interface 608, respectively, using wired technologies (e.g., wires, USB, fiber optic cable, etc.), wireless technologies (e.g., WiFi, cellular, satellite, BLUETOOTH, etc.), or other connection technologies. The network 116 is representative of any type of communication network, including data and/or voice network, and may be implemented using wired infrastructure (e.g., cable, CAT5, fiber optic cable, etc.), a wireless infrastructure (e.g., RF, cellular, microwave, satellite, BLUETOOTH, etc.), and/or other connection technologies.

In addition to communicating with each other locally using access point 124, or over network 116, the electronic device 110 and the remote server(s) 120 may also each communicate with a cell carrier 121 over network 116 to enable telephone communication using the electronic device 110, or portable wireless device 122.

As illustrated, memory 508 of electronic device 110 also stores or otherwise has access to a user identification engine 516, which functions to identify a user that utters an audible command. When the user is audibly interacting with electronic device 110 it indicates that the user is physically present in the vicinity of the electronic device. Similarly, where electronic device 110 supports other forms of user interaction, such as with a keyboard, keypad, touch pad, touch screen etc., that user interaction also indicates that the user is physically present when making the interaction. Any of those interactions can be used to determine, a presence indication that correlates the location of a user with respect to electronic device 110. When the user stops interacting, the likelihood that the user remains physically present decreases as time passes. This can also serve as a presence indication for that particular user. The presence indicator may reflect the last time the user was interacting with the electronic device, the length of time that the user interacted with the electronic device, in addition to details of how the user interacted with the electronic device (e.g. what they did, what they heard, what they said etc.).

Where electronic device 110 also includes an imaging capability or camera and a user interacts with electronic device 110 using that image capability, then a user presence indicator can also consider when and where the user was most recently seen, and associate the location of that particular electronic device 110 as a user presence indicator.

Upon receiving audio within environments 102 or 103, the speech-recognition engine 512 may first attempt to identify whether or not the audio contains speech, such as speech from a user. If so, then the speech-recognition engine 512 may perform automatic speech recognition (ASR) on the audio and may perform an action corresponding to any command from the audio.

For instance, as described below in greater detail, if an incoming call is being signaled by portable wireless device 122, and that incoming call is announced through electronic devices 110_a_, 110_b_ and 110_c_, a user may issue a verbal command requesting that the electronic device 110 answer the incoming phone call. As such, the speech-recognition engine 512 may identify this verbal command and the electronic device 110 answers the incoming call. Answering the incoming call includes establishing a communication session, where the call audio is sent between the two devices during the communication session.

In addition, and as illustrated, the electronic device 110 may output a response before performing the speech recognition. For instance, electronic device 110 may output an indication that a call to portable wireless device 122 is being received, and electronic device 110 may verbally identify the caller, or calling number. Where a contact database is available, electronic device 110 may locate additional information related to the caller, using the calling number or other parts of the caller id. That additional information may be included when electronic device 110 verbally announces the call.

Similarly, electronic device 110 may output a response after performing the speech recognition to indicate that the device will comply with the request, with this indication being audible, visual, or the like. For instance, the electronic device 110 audibly outputs a response indicating that the electronic device 110 will answer the phone call as requested. In these examples, the audible response may include the caller's name, which may be extracted from caller ID information.

FIG. 5 shows selected functional components of electronic device 110 in more detail. Generally, electronic device 110 may be implemented as a standalone device that is relatively simple in terms of functional capabilities with limited input/output components, memory and processing capabilities. For instance, electronic device 110 does not typically have a physical input, such as no keyboard, no keypad, or other form of mechanical input. Further, it typically does not have a display or touch screen to facilitate visual presentation and user touch input. Instead, electronic device 110 may be implemented with the ability to receive and output audio, a network interface (wireless or wire-based), power, and limited processing/memory capabilities. However, electronic device 110 is not limited to only audible input and output, and a display or touch screen, or other physical input capability is also possible in addition to audio input and output.

As illustrated in FIG. 5, electronic device 110 includes at least one processor 506 and memory 508. Memory 508 may include computer-readable storage media ("CRSM"), which may be any available physical media accessible by processor 506 to execute instructions stored on the memory. CRSM may include random access memory ("RAM") and Flash memory. CRSM may also include, but is not limited to, read-only memory ("ROM"), electrically erasable programmable read-only memory ("EEPROM"), or any other medium which can be used to store the desired information and which can be accessed by the processor 506. Memory 508 also includes operating system 510, which serves to implement most of the desired functions using processor 506.

Electronic device 110 includes one or more microphones 502 to receive audio input, such as user voice input, and one or more speakers 504 to output audio. A codec 518 is coupled to microphone 502 and speaker 504 to encode and/or decode the audio signals. The codec may convert audio data between analog and digital formats. A user may interact with the electronic device 110 by speaking to it, and the microphone 502 captures the user speech. The codec 518 encodes the user speech and transfers that audio data to other components. The electronic device 110 can communicate back to the user by emitting audible statements through speaker 504. In this manner, the user can interact with the device using speech, without use of a keyboard or display common to other types of electronic devices.

In the illustrated example, the electronic device 110 includes a wireless interface 520 coupled to one or more antenna 522 to facilitate a wireless connection to a network. The wireless interface 520 may implement one or more of various wireless technologies, such as Wi-Fi, BLUETOOTH, ZIGBEE, and so on.

The electronic device 110 may also include one or more device interfaces 524 to facilitate a wired connection to a network, or a plug-in network device that communicates with other wireless networks. The device interfaces 524 may comprise a USB port and/or other forms of wired connections such as a broadband connection. A power unit 526 is further provided to distribute power to the various components on electronic device 110.

The electronic device 110 is designed to support audio interactions with the user, in the form of receiving voice commands (e.g., words, phrase, sentences, etc.) from the user and outputting audible feedback to the user. Accordingly, as illustrated, there are no physical input devices, such as navigation buttons, keypads, joysticks, keyboards, touch screens, and the like. Further there is no display for text or graphical output. The electronic device 110 may include non-input control mechanisms, such as basic volume control button(s) for increasing/decreasing volume, as well as power and reset buttons. There may also be a light element (e.g., LED) to indicate a state such as, for example, when power is on or to provide a notification to the user. As an example, the LED may be illuminated with a particular color or pattern to indicate there is an incoming call. But, otherwise, the electronic device 110 typically does not use or need to use input devices or displays.

Instructions, datastores, and so forth may be stored within memory 508 and configured to execute on the processor 506. An operating system module 510 is configured to manage hardware and services (e.g., wireless unit, USB, Codec) within and coupled to the electronic device 110 for the benefit of other modules.

In addition, memory 508 may include the speech-recognition engine 512, the user identification engine 516, and the network interface 514 discussed above. Also as discussed above, some or all of the engines, data stores, and components may reside additionally or alternatively at the remote server(s) 120.

Electronic device 110 may be used for both inbound and outbound communications. Those communications include audio and video, synchronous and asynchronous communications. Those communications also include text messaging, video messaging, and picture messaging. In one example, a wireless communication to a user is received by portable wireless device 122. The communication may be received while the portable wireless device is with the user at home (environment 102) or while the portable wireless device is at another location (environment 103) that includes a electronic device 110. For any number of reasons, the user may wish to answer and conduct the incoming call using electronic device 110, instead of using portable wireless device 122. For example, portable wireless device 122 may be across the room, and not within reach. Or, the user may be cooking and otherwise have their hands occupied making it difficult to use portable wireless device 122.

In most instances, portable wireless device 122 includes an operating system that provides the main program for operation of the device. In addition, various software applications can be installed and operate on portable wireless device 122. These applications provide additional functionality to the portable wireless device. Portable wireless device 122 may include such an application that is specifically developed to support and enhance the interaction between portable wireless device 122, electronic devices 110 and remote server(s) 120. In some instances, the application indicates that portable wireless device 122 and a user of the portable wireless device also has access to and uses electronic devices 110. The application may include identification information for one or more of those electronic devices 110, and the application may facilitate many of the interactions described herein.

Where there are multiple electronic devices 110 in the environment, such as environment 102, determining which particular electronic device 110 should be the audio interface to the user may not be immediately apparent. In one implementation, a BLUETOOTH connection between portable wireless device 122 and electronic device 110 is used to pass signals for the communication. Thus in a similar manner, determining which particular electronic device 110 should connect to portable wireless device 122 using BLUETOOTH may not be immediately apparent.

Before there can be any coordinated communication between portable wireless device 122 and electronic device 110, each may undergo an initial setup process, and then once that initial setup has been completed, there may be a subsequent registration process, such as when the device is powered up, or enters a new environment. For portable wireless device 122, the initial setup may include associating a user identity with the particular portable wireless device, associating a telephone number with the portable wireless device, and associating hardware identification of the portable wireless device with the user account. The hardware identification of the portable wireless device may include MAC addresses for 802.11 radios in the portable wireless device, and MAC addresses for BLUETOOTH radios in the portable wireless device.

The setup for electronic device 110 similarly may associate certain user identification with a particular electronic device 110, or it may include associating multiple electronic devices with one or more user identities. MAC addresses for 802.11 radios in the device, and MAC addresses for BLUETOOTH radios in the device may also be associated with the user identity.

The BLUETOOTH protocol (IEEE 802.15.1 and the Bluetooth Special Interest Group—SIG) describes the pairing and subsequent connection of two BLUETOOTH devices. Pairing of two devices may require some level of user interaction before the two devices can be connected for communication. Once the two BLUETOOTH devices are paired, then they may automatically connect without further user interaction. For this reason, it may be appropriate to initially pair portable wireless device 122 with one or more electronic devices 110 using BLUETOOTH. In this way, each obtains identifying information about the other that can be used for subsequent communication and connection.

Figure 7:
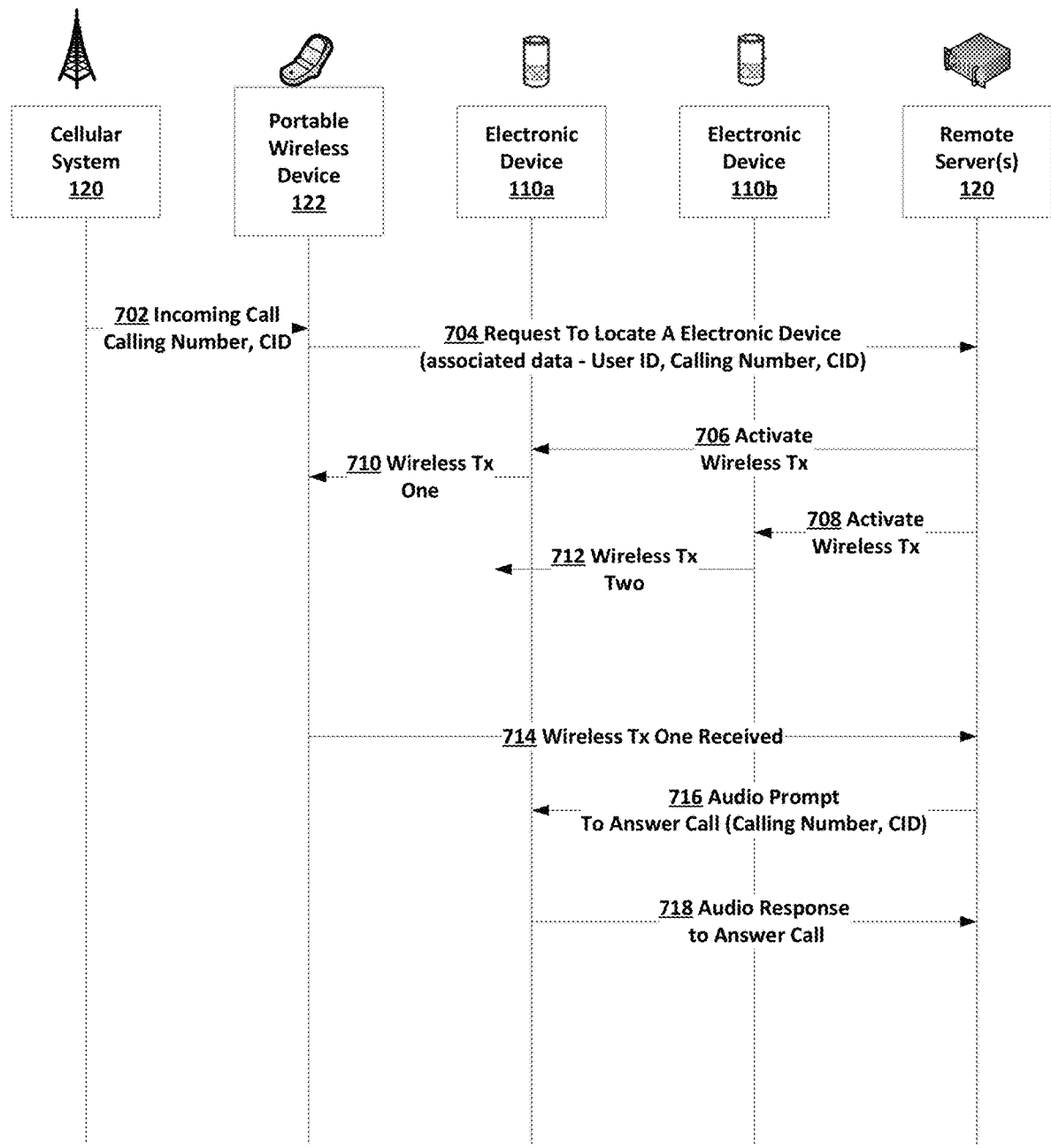
FIG. 7 shows an illustrative process of identifying one of a plurality of electronic devices for communication with another device.

FIG. 7 illustrates one implementation for determining which of multiple electronic devices 110, to use for routing audio from a telephone call over portable wireless device 122. Before any of the illustrated steps, portable wireless device 122 and electronic devices 110a and 110b have been setup and have exchanged BLUETOOTH pairing type information. However, even though portable wireless device 122 and electronic devices 110 may bee setup and are paired, there may not be an active communication link between portable wireless device 122 and any of electronic devices 110.

At 702, portable wireless device 122 receives notification of an incoming call. The received notification may include caller identification, with name and/or number of the caller. Either before or after portable wireless device 122 announces receipt of the incoming call, with a ring or other notification, portable wireless device 122 sends at 704 a request to locate an appropriate nearby electronic device 110 for audio routing of the incoming call. The request from portable wireless device 122 is sent to remote server(s) 120, and may include the caller identification, with name and/or number of the caller, in addition to identification of the user and/or particular portable wireless device 122.

At 706, remote server(s) 120 sends commands to electronic devices 110a to activate a wireless radio frequency transmission. In some implementations this is referred to as a beacon. The wireless transmissions activated by electronic device 110a may be a BLUETOOTH beacon, such as a BLUETOOTH Low Energy (BLE) beacon. Alternatively, the wireless transmission activated by electronic device 110a is another BLUETOOTH transmission, or it may be a Wi-Fi transmission. The transmitted beacon has limited range, and if the transmitted beacon is received by another device, then the transmitting and receiving devices are within the wireless transmission range of each other.

At 708, remote server(s) 120 sends the same or a similar command to electronic device 110b to activate a wireless radio frequency transmission.

At 710, electronic device 110a begins to transmit a wireless beacon by activating the associated radio frequency transmitter of electronic device 110a. The wireless beacon transmission includes identification information about the transmitting device, such as device ID or MAC address, etc.

At 712, electronic device 110b begins to transmit a wireless beacon by activating the associated radio frequency transmitter of electronic device 110b. Similar to the beacon transmitted at 710, the wireless beacon at 712 includes identification information about the transmitting device, such as device ID or MAC address, etc. If portable wireless device 122 is within BLUETOOTH wireless range of electronic device 110a, but portable wireless device 122 is not within BLUETOOTH wireless range of electronic device 11b, then portable wireless device 122 will only receive wireless transmission 710.

At 714, portable wireless device 122 sends a data communication over network 116 to remote server(s) 120. Information in the data communication indicates to remote server(s) 120 that portable wireless device 122 received the beacon transmission at 710, and based on that data, remote server(s) 120 determines that electronic device 110a is within wireless range of portable wireless device 122.

At 716, remote server(s) 120 sends commands to electronic device 110a to announce the incoming call using speaker 504. Using the caller identification information that was sent at 702, the announcement may include caller identification, with name and/or number of the caller. Remote server(s) 120 includes user information, such as illustrated in FIG. 4, as well as a contact database associated with the user and portable wireless device 122. If the incoming call identification only included a calling telephone number, remote server(s) 120 may search that user contact database, and if the database includes a caller name corresponding to the calling number, include the caller name for announcement as well. The announcement might be something like: "Your mother is calling, would you like to answer the call using your device?"

At 718, electronic device 110*a* receives the user response to the audio prompt, indicating that the user wants to answer the call. That user response might be something like: "Yes, please answer the call."

Figure 10:
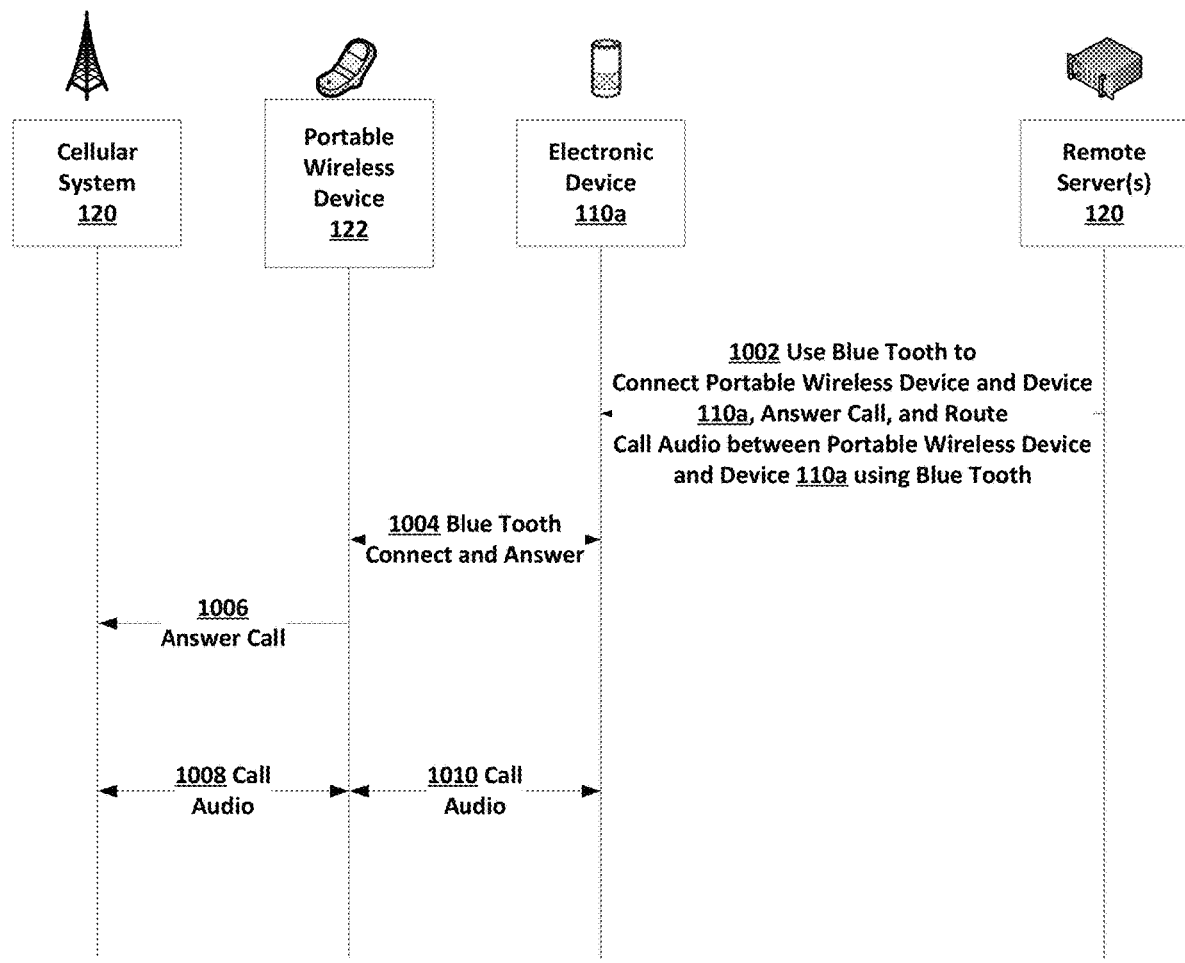
FIG. 10 shows an illustrative process of receiving an incoming communication using a first device and a second device.
Figure 11:
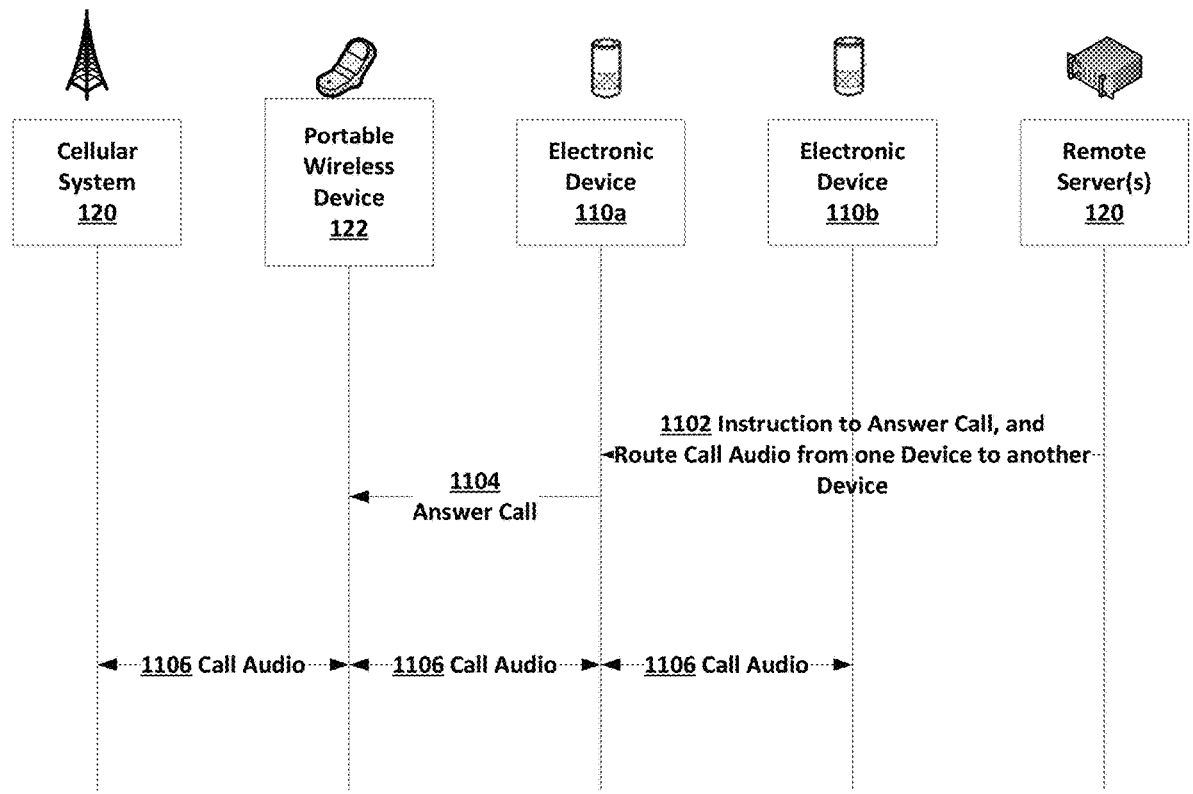
FIG. 11 shows an illustrative process of receiving an incoming communication using a first device and a second device.

When remote server(s) 120 receives confirmation from electronic device 110*a* that the call should be routed to electronic device 110*a*, various options are possible, depending on how individual systems are configured. Some of those options are illustrated in FIGS. 10-11 and described in greater detail below.

Figure 8:
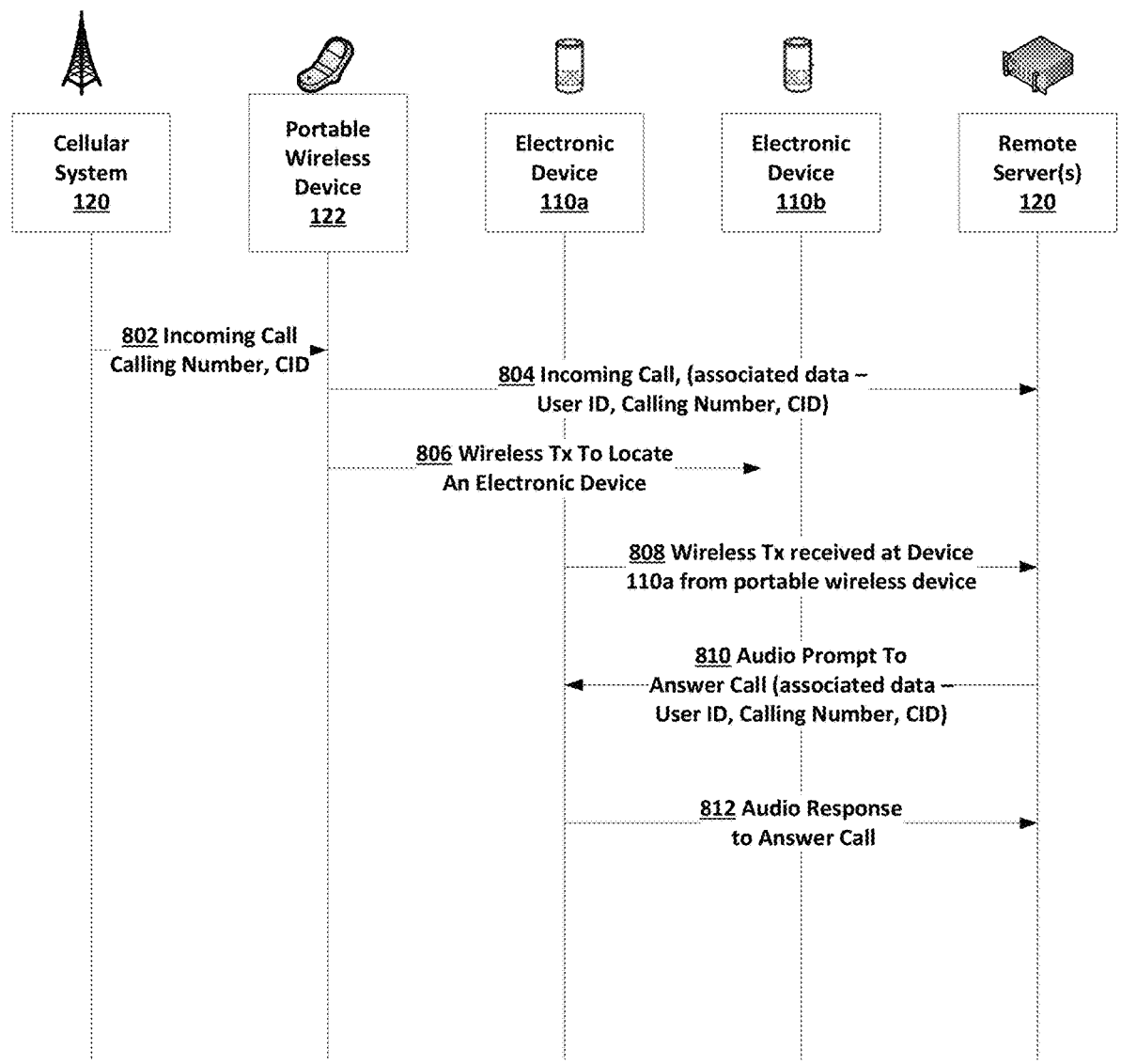
FIG. 8 shows an illustrative process of identifying one of a plurality of electronic devices for communication with another device.

FIG. 8 illustrates an option for determining which device might be appropriate for routing an incoming call. At 802, portable wireless device 122 receives notification of an incoming call. The received notification may include caller identification, with name and/or number of the caller. Either before or after portable wireless device 122 announces receipt of the incoming call, with a ring or other notification, portable wireless device 122 sends at 804 information to remote server(s) 120. The information sent at 804 to remote server(s) 120 may include the caller identification, with name and/or number of the caller, in addition to identification of the user and/or particular portable wireless device 122.

At 806, portable wireless device 122 sends a radio frequency transmission or beacon to locate an appropriate nearby electronic device 110 for audio routing of the incoming call. The wireless transmission sent by portable wireless device 122 may be a BLUETOOTH beacon, such as a BLUETOOTH Low Energy (BLE) beacon. The wireless transmission sent by portable wireless device 122 may also be another BLUETOOTH transmissions, or it may be a Wi-Fi beacon or transmissions.

At 808, electronic device 110*a* sends a data communication to remote server(s) 120, which indicates to remote server(s) 120 that the wireless transmission 804 was received by electronic device 110*a*. Using that information, remote server(s) 120 determines that portable wireless device 122 and electronic device 110*a* are able to communicate with each other, and are within wireless communication range of each other.

At 810, remote server(s) 120 sends commands to electronic device 110*a* to announce the incoming call using speaker 504. The announcement may include caller identification, with name and/or number of the caller. If the incoming call identification only included a calling telephone number, remote server(s) 120 may search a contacts database for the portable wireless device user, and if the database includes a caller name corresponding to the calling number, include the caller name for announcement as well. The announcement might be something like: "Your mother is calling, would you like to answer the call using your device?"

At 812, electronic device 110*a* receives the user response to the audio prompt, which indicates that the user wants to answer the call. That user response might be something like: "Yes, please answer the call."

When remote server(s) 120 receives confirmation from electronic device 110*a* that the call should be routed to electronic device 110*a*, various options are possible, depending on how individual systems are configured. Some of those options are illustrated in FIGS. 10-11 and described in greater detail below.

Although not illustrated in FIG. 8, it is possible that when at 806 portable wireless device 122 sends a radio frequency transmission or beacon to locate an appropriate nearby electronic device 110 for audio routing of the incoming call, more than one electronic device 110 receives that radio frequency transmission or beacon. For example electronic devices 110*b* and 110*a* might both receive the transmission. In such an instance, a presence indicator, as described elsewhere might be used to indicate that the user has most recently been located near electronic device 110*a* and for that reason remote server(s) 120 selects that particular device at 810 and sends commands to electronic device 110*a* to announce the incoming call using speaker 504.

Where more than one electronic device 110 receives the transmission from portable wireless device 122, and where a presence indicator may not be available, remote server(s) 120 may be unable to determine which particular electronic device 110 is appropriate, and sends commands to both electronic device 110*a* and electronic device 110*b* to announce the incoming call. The user hears the announcement from one of electronic device 110*a* or electronic device 110*b*, and when the user responds, either electronic device 110*a* or electronic device 110*b* receives that user response. The electronic device that receives the user response reports that user response to remote server(s) 120.

Figure 9:
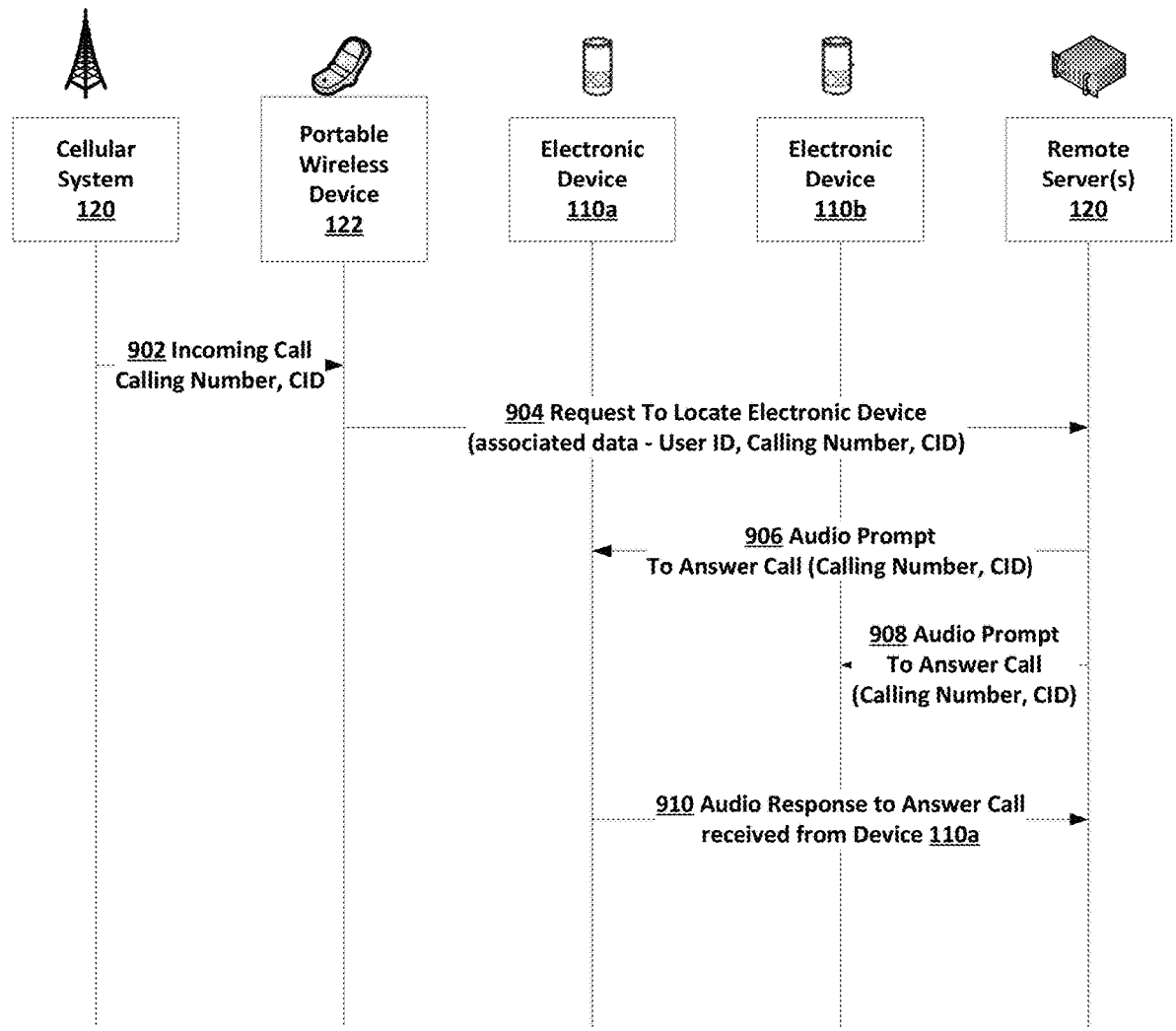
FIG. 9 shows an illustrative process of identifying one of a plurality of electronic devices for communication with another device.

FIG. 9 also illustrates determining which device might be appropriate for routing an incoming call. At 902, portable wireless device 122 receives notification of an incoming call. The received notification may include caller identification, with name and/or number of the caller. Either before or after portable wireless device 122 announces receipt of the incoming call, with a ring or other notification, portable wireless device 122 sends at 904 a request to locate an appropriate nearby electronic device 110 for audio routing of the incoming call. The request from portable wireless device 122 is sent to remote server(s) 120, and may include the caller identification, with name and/or number of the caller, in addition to identification of the user and/or particular portable wireless device 122.

At 906, remote server(s) 120 sends commands to electronic devices 110*a* to make an audio announcement of the incoming call. At 908, remote server(s) 120 sends similar commands to electronic device 110*b* to make an audio announcement of the incoming call. The announcement may include caller identification, with name and/or number of the caller. If the incoming call identification only included a calling telephone number, remote server(s) 120 may search a contacts database for the portable wireless device user, and if the database includes a caller name corresponding to the calling number, include the caller name for announcement as well. The announcement might be something like: "Your mother is calling, would you like to answer the call using your device?" Hearing the announcement, the user responds to the audio prompt, indicating that they want to answer the call. That user response might be something like: "Yes, please answer the call."

If the user is located near or in the same room as electronic device 110*a*, the user's audio response is received by electronic device 110*a* but it may not be received by electronic device 110*b*. At 910, electronic device 110*a* sends the audio response to remote server(s) 120, which indicates to remote server(s) 120 that the user is located near or within audio range of electronic device 110*a*.

When remote server(s) 120 receives confirmation from electronic device 110*a* that the call should be routed to electronic device 110*a*, various options are possible, depending on how individual systems are configured. Some of those options are illustrated in FIGS. 10-11 and described in greater detail below.

It should be noted that as illustrated in FIG. 9, location of the user with respect to electronic device 110a was determined or confirmed based on the user's voice response. However, portable wireless device 122 may not have been located near the user or electronic device 110a. In fact, portable wireless device 122 might be located in environment 103, while the user and electronic device 110a might be located in environment 102.

Once the system has determined to route incoming call audio through electronic device 110a, multiple options are possible. FIG. 10 illustrates one such option. At 1002, remote server(s) 120 sends commands to electronic device 110a to use BLUETOOTH to connect portable wireless device 122 with electronic device 110a, answer the call, and once connected, route the call audio between portable wireless device 122 and electronic device 110a over that BLUETOOTH connection.

At 1004, portable wireless device 122 and electronic device 110a establish a BLUETOOTH connection, and electronic device 110a instructs portable wireless device 122 to answer the incoming call.

At 1006, portable wireless device 122 answers the call, and at 1008 and 1010, portable wireless device 122 routes audio for the call between cellular system 121 and electronic device 110a using the BLUETOOTH connection.

FIG. 11 illustrates another option for routing incoming call audio through electronic device 110a. At 1102, remote server(s) 120 send commands to electronic device 110a to answer the call, and route the call audio from one device to another device.

At 1104, electronic device 110a sends commands to portable wireless device 122 to answer the call.

At 1106, the call audio is routed from cellular system 121 to portable wireless device 122 and then to electronic device 110a and electronic device 110b. In some implementations, some or all of the audio call routing might use Voice Over Internet Protocol (VOIP).

Figure 12:
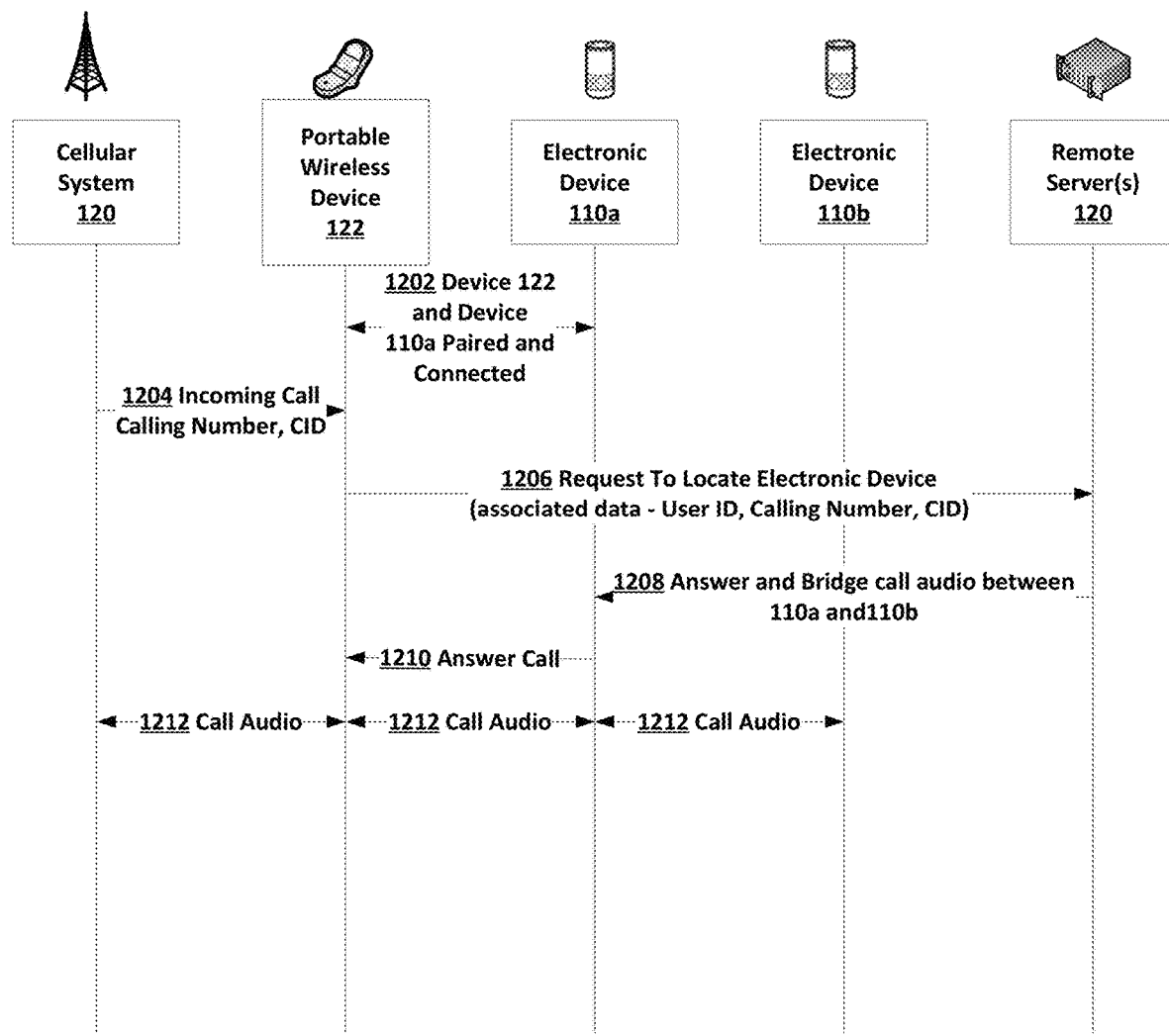
FIG. 12 shows an illustrative process of identifying one of a plurality of electronic devices for communication with another device.

FIG. 12 illustrates another option where at 1202 portable wireless device 122 and electronic device 110a are already paired with each other and connected with each other. This might be a BLUETOOTH connection.

At 1204, portable wireless device 122 receives notification of an incoming call. The received notification may include caller identification, with name and/or number of the caller. Either before or after portable wireless device 122 announces receipt of the incoming call, with a ring or other notification, portable wireless device 122 sends at 1206 a request to locate an appropriate nearby electronic device 110 for audio routing of the incoming call. Although portable wireless device 122 and electronic device 110a are already paired and connected, there may be reasons why it is not appropriate or desired for the call audio to be routed to electronic device 110a.

The request at 1206 from portable wireless device 122 is sent to remote server(s) 120, and may include the caller identification, with name and/or number of the caller, in addition to identification of the user and/or particular portable wireless device 122.

Remote server(s) 120 determines that the call audio should be routed to electronic device 110b, and at 1208, remote server(s) 120 instructs electronic device 110a to bridge the call and route the call audio between electronic device 110a and electronic device 110b. Remote server(s) 120 also sends commands at 1208 to answer the incoming call. Bridging a call between electronic device 110a and electronic device 110b is accomplished using VOIP, or other similar technologies. The bridge allows communication data that represents the call audio to be sent between two devices.

At 1210, electronic device 110a sends commands to portable wireless device 122 to answer the call, and at 1212, the call audio is routed from cellular system 121 to portable wireless device 122 and then to electronic device 110a and then to electronic device 110b.

There may be circumstances where a user and the portable wireless device are not in the same location. In these circumstances, such as where there is an electronic device 110 located with the portable wireless device at one location, and another electronic device 110 is located with the user at another location, bridging from one location to another location allows a user to answer an incoming call to the portable wireless device even though the user and portable wireless device are in different locations. This can be illustrated with reference to FIG. 1D. Portable wireless device 122 is located in environment 102, and electronic devices 110a, 110b and 110c are also located in environment 102. A user may be located in environment 103, with electronic device 110d. The user may want to answer an incoming call to the portable wireless device, using electronic device 110d. To implement this, the system uses one of the previously described techniques for determining which electronic device 110 is located with portable wireless device 122. For example, when notified of an incoming call, portable wireless device 122 might transmit a wireless beacon, such as illustrated in FIG. 8, to determine which device is located with portable wireless device 122. Or, remote server(s) 120 might cause the electronic devices 110 to transmit wireless beacons, such as illustrated in FIG. 7, to determine which device is near portable wireless device 122.

Once it is determined that one of the electronic devices (e.g., 110a) is located with portable wireless device 122, a wireless connection, such as BLUETOOTH is used to connect portable wireless device 122 to the nearby electronic device 110a. This is illustrated in FIG. 10. However, the user is not located in environment 102 with either of portable wireless device 122 or BLUETOOTH connected electronic device 110a. Instead the user is located in environment 103 with electronic device 110d. In this implementation, a bridge connection is established between electronic device 110a in environment 102 and electronic device 110d in environment 103. The bridge connection may be routed through remote server(s) 120, or it may be a direct connection between the two electronic devices using network 116. The call audio is routed between the two electronic devices using VOIP or another suitable transport protocol.

Figure 13:
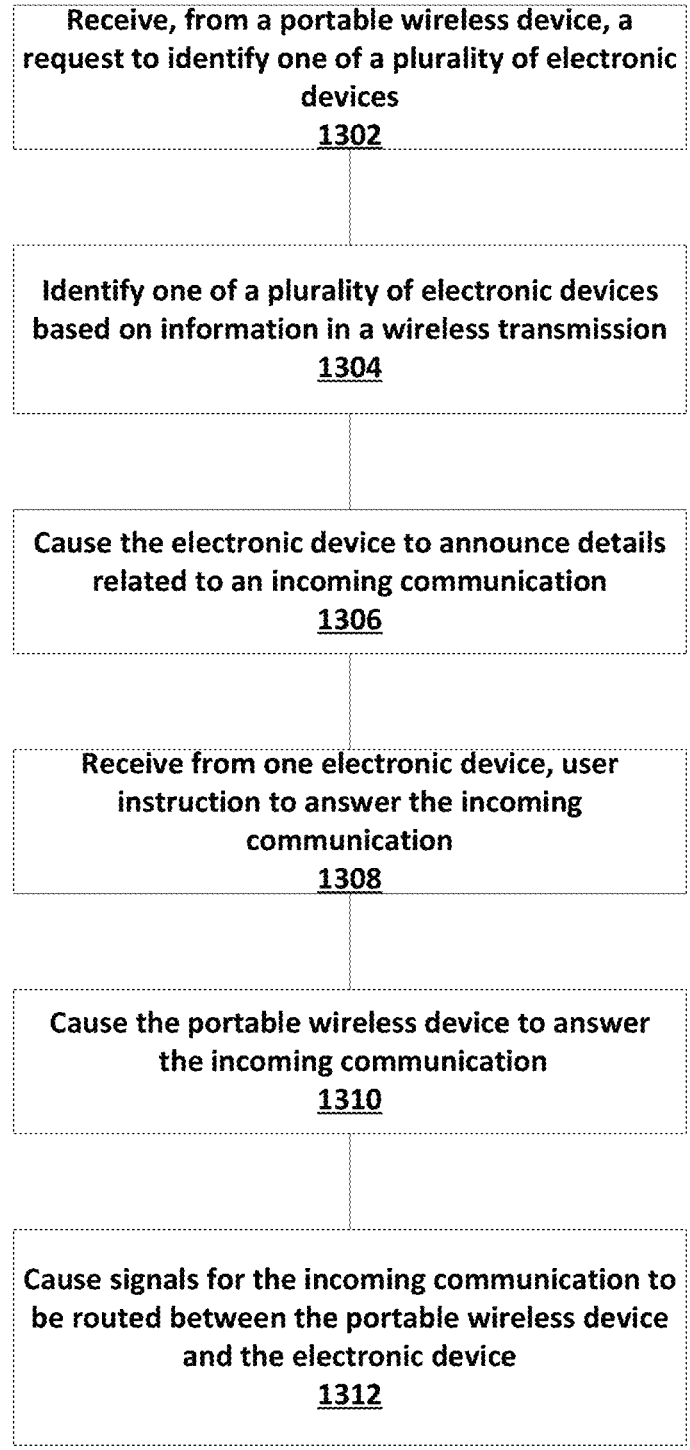
FIG. 13 shows an illustrative process of identifying one of a plurality of electronic devices for communication with another device, and receiving an incoming communication using a first electronic device and another electronic device.
Figure 14:
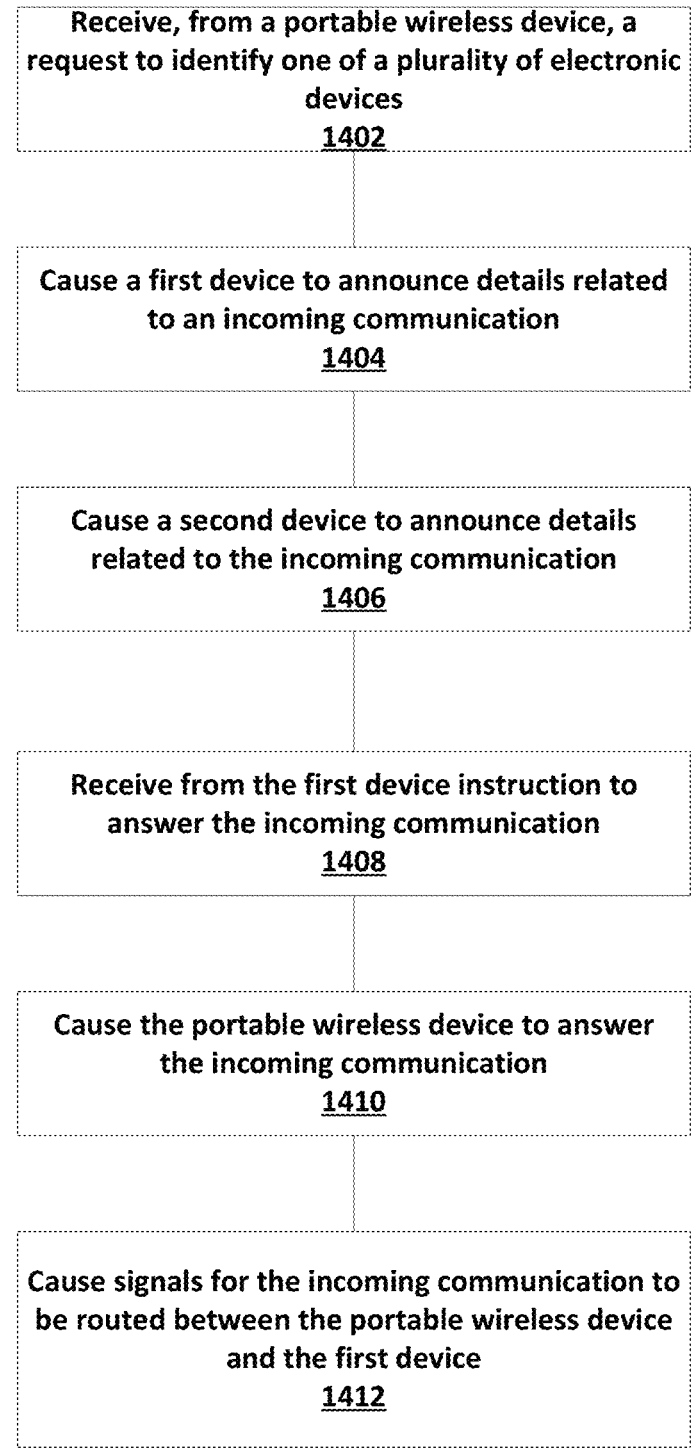
FIG. 14 shows an illustrative process of identifying one of a plurality of electronic devices for communication with another device, and receiving an incoming communication using a first electronic device and another electronic device.

These and other options are further illustrated in FIGS. 13 and 14. At 1302, remote server(s) 120 receives a request to identify one of a plurality of electronic devices 110 that are with portable wireless device 122. That request is sent from portable wireless device 122 to remote server(s) 120, when the portable wireless device receives a notice there is an incoming call.

At 1304, remote server(s) 120 identifies one of the electronic devices 110 that are with portable wireless device 122. This is accomplished when remote server(s) 120 instructs or causes the electronic devices 110 to activate a wireless beacon transmission. Examples of such a wireless beacon transmission include a BLUETOOTH low energy beacon and a Wi-Fi beacon. Portable wireless device 122 listens for a wireless transmission, and reports receipt of the signal from one or more wireless transmissions to remote server(s) 120. The beacon transmission includes identification information for the transmitting device, which may include a MAC address, or other identifier. That identification information is received by portable wireless device 122 with the wireless transmission, and that same identification information is then provided to remote server(s) 120. As such, using the information reported by portable wireless device 122, remote server(s) 120 knows which electronic device 110 is with portable wireless device 122, or if multiple electronic devices 110 are with portable wireless device 122, which electronic device 110 has the best received signal strength. Using the example illustrated in FIG. 1A, this is electronic device 110*a*.

At 1306, remote server(s) 120 causes nearby electronic device 110*a* to announce details related to the incoming call. The incoming call details were previously received from portable wireless device 122 at 1302. Those incoming call details may include caller name, or number, and may also include details from a local contact database that is accessible to remote server(s) 120 that have been matched to information received from portable wireless device 122. As an example, if the incoming call detail received from portable wireless device 122 included only the caller number, the contact database might include a correlation of that number to a name, and it might further include identification of that name as a user's mother. This allows the remote server(s) 120 to instruct electronic device 110*a* to announce the call as coming from the user's mother, instead of simply announcing the caller's number, or name.

At 1308, a user responds to verbal announcement of an incoming call, instructing electronic device 110*a* to answer the call. The content of that verbal response is sent to remote server(s) 120.

At 1310, remote server(s) 120 sends commands that cause portable wireless device 122 to answer the incoming call.

At 1312, remote server(s) 120 sends commands that cause portable wireless device 122 to wirelessly connect with electronic device 110*a*, and then route the call so that audio for the call is sent and received using microphone 502 and speaker 504 of electronic device 110*a*. In one implementation, the wireless connection between portable wireless device 122 and electronic device 110*a* is BLUETOOTH. It could also include Wi-Fi.

Other options are illustrated in FIG. 14. At 1402, remote server(s) 120 receives a request to identify one of a plurality of electronic devices 110. That request is sent from portable wireless device 122 to remote server(s) 120, when portable wireless device 122 receives a notice there is an incoming call.

At 1404, remote server(s) 120 instructs or causes the first electronic device 110 to announce details of the incoming call. At 1406, remote server(s) 120 instructs or causes the second electronic device 110 to announce details of the incoming call. In 1404 and 1406, some or all of the electronic devices that are correlated with the user are instructed to announce the incoming call details. In the example illustrated in FIG. 1D, this would include electronic devices 110*a*, 110*b*, 110*c* and 110*d*. The incoming call details were previously received from portable wireless device 122 at 1402. Those incoming call details may include caller name, or number, and may also include details from a local contact database that is accessible to remote server(s) 120 that have been matched to information received from portable wireless device 122. As an example, if the incoming call detail received from portable wireless device 122 included only the caller number, the contact database might include a correlation of that number to a name, and it might further include identification of that name as a user's mother. This allows the remote server(s) 120 to instruct electronic devices 110 to announce the call as coming from the user's mother, instead of simply announcing the caller's number, or name.

At 1408, a user responds to verbal announcement of an incoming call, instructing electronic device 110 to answer the call. The content of that verbal response is sent to remote server(s) 120. In the example illustrated in FIG. 1A, if the user is located in environment 102, and is also near portable wireless device 122, then the user response would be received by electronic device 110*a* and then sent to remote server(s) 120.

Similarly, if the user is located in environment 103 as illustrated in FIG. 1D, and is near electronic device 110*d*, then the user response would be received by electronic device 110*d* and then sent to remote server(s) 120.

At 1410, remote server(s) 120 sends commands that cause portable wireless device 122 to answer the incoming call.

At 1412, remote server(s) 120 sends commands that cause portable wireless device 122 to wirelessly connect with the electronic device 110 that is with the user and that received the verbal instruction at 1408. Remote server(s) 120 also sends commands that cause the call to be routed so that audio for the call is sent and received using microphone 502 and speaker 504 of electronic device 110. In one implementation, the wireless connection between portable wireless device 122 and electronic device 110*a* is BLUETOOTH. It could also include Wi-Fi.

In addition to the examples described above, and illustrated in the Figures, the system described herein supports other variations. For example, when portable wireless device 122 receives an incoming communication, and provides a notification of the incoming communication, the user may verbally instruct electronic device 110*a* to answer the communication. Electronic device 110*a* detects whether portable wireless device 122 is within BLUETOOTH range, and if so the two devices connect and the communication audio is routed between portable wireless device 122 and electronic device 110*a*. When the communication ends, electronic device 110*a* disconnects the BLUETOOTH connection, although the two devices will likely remain paired.

The descriptions above have related primarily to incoming calls. Much of the same system architecture and methods can be used for outgoing calls. For example, a user located near a device can make a verbal instruction such as: "Alexa, call my mother." Upon receipt of that instruction, the device forwards the instruction to remote server(s) 120. Remote server(s) 120 instructs all electronic devices 110 to activate a BLUETOOTH beacon, so one of the electronic devices 110 can be located with respect to portable wireless device 122. Portable wireless device 122 receives one of those wireless transmissions, with information identifying the transmitting electronic device 110. Portable wireless device 122 sends that information identifying the electronic device 110 associated with the received wireless transmission to remote server(s) 120. Remote server(s) 120 instructs portable wireless device 122 and the electronic device 110 to establish a BLUETOOTH connection. Remote server(s) 120 sends the called number information to portable wireless device 122, and instructs portable wireless device 122 to place the call and send call audio over the BLUETOOTH connection to the electronic device 110. If the electronic device 110 that is connected to the portable wireless device 122 by BLUETOOTH is the same electronic device 110 that the user is audibly communicating with, the call then proceeds. Otherwise, the two electronic devices 110 are bridged together, and the call proceeds.

Figure 15:
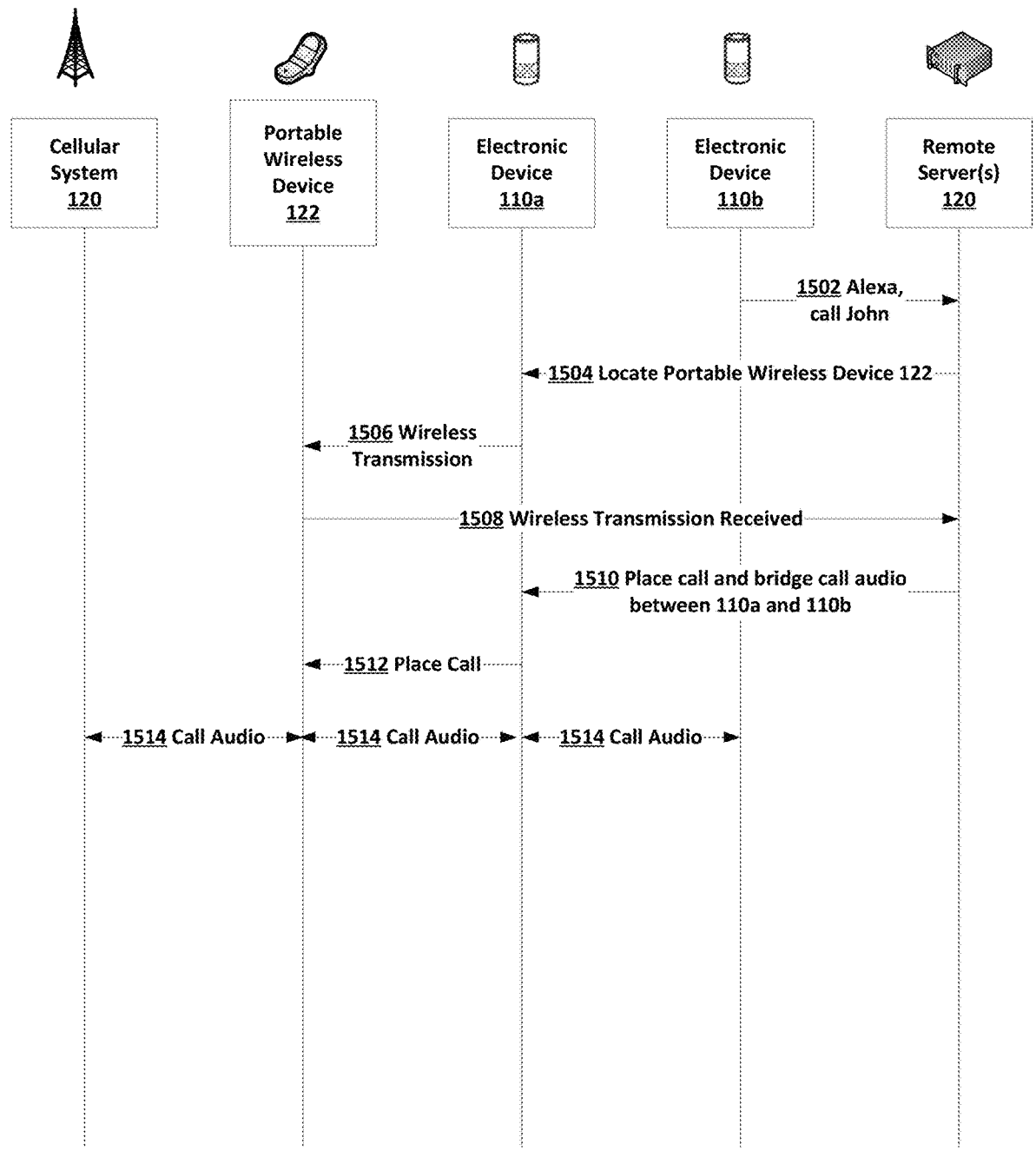
FIG. 15 shows an illustrative process of making an outgoing communication using a plurality of devices.

As illustrated in FIG. 15, electronic device 110*b* receives an audible instruction to place an outgoing communication.

Electronic device 110b determines there is no portable wireless device 122 within BLUETOOTH range to make the outgoing call. The instruction may include a called number, or it may identify a called entity, such as a person. The user contacts database, discussed elsewhere, can be searched to identify any additional information, such as called number, that may be needed to establish the outgoing communication. At 1502, electronic device 110b sends the instruction and called number or called entity to remote server(s) 120. At 1504, remote server(s) 120 sends commands to another electronic device 110a to transmit beacon data (1506).

At 1508, portable wireless device 122 receives the transmitted beacon data, and sends identifying information from the beacon data to remote server(s) 120.

At 1510, remote server(s) 120 instructs electronic device 110a to connect with portable wireless device 122, place the outgoing communication, and bridge the communication between electronic device 110a and electronic device 110b.

At 1512, electronic device 110a connects with portable wireless device 122, instructs portable wireless device 122 to place the outgoing communication.

Once the outgoing communication is made, at 1514 the communication audio is routed to electronic device 110b.

Figure 16:
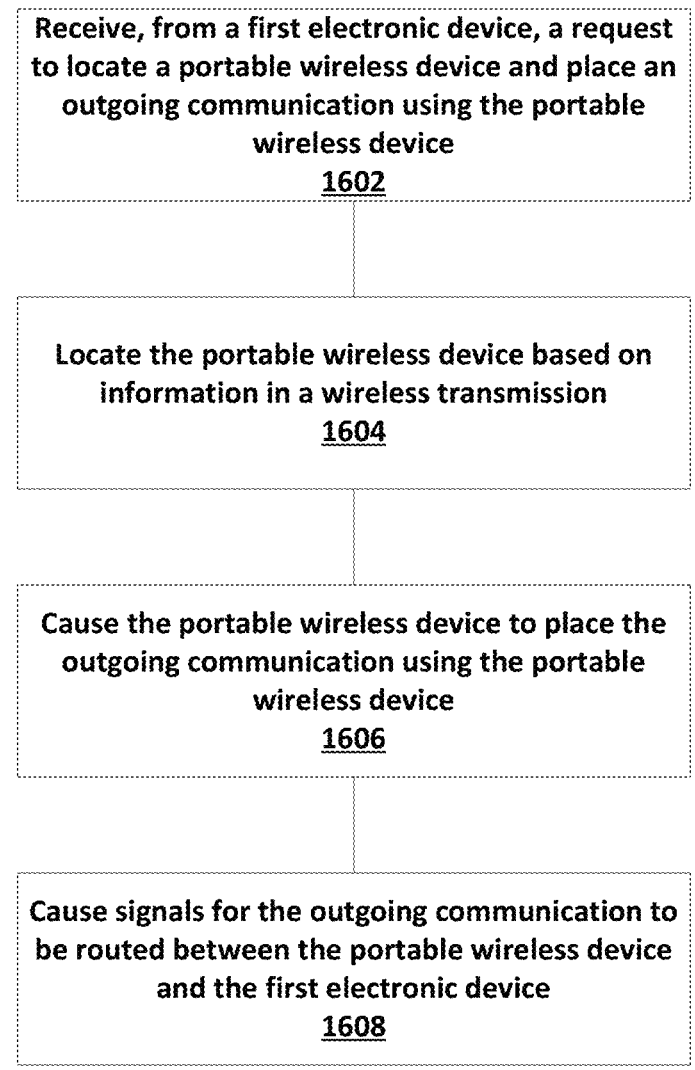
FIG. 16 shows an illustrative process of making an outgoing communication using a plurality of devices.

Referring to FIG. 16, at 1602, the system receives, from a first electronic device, a request to locate a portable wireless device and place an outgoing communication using the portable wireless device.

At 1604, the system locates the portable wireless device based on information in a wireless transmission. The wireless transmission may be the same or similar to the wireless transmissions described with reference to FIG. 7.

At 1606, the system causes the portable wireless device to place the outgoing communication.

At 1608, the system causes signals for the outgoing communication to be sent between the portable wireless device and the first electronic device.

Figure 17:
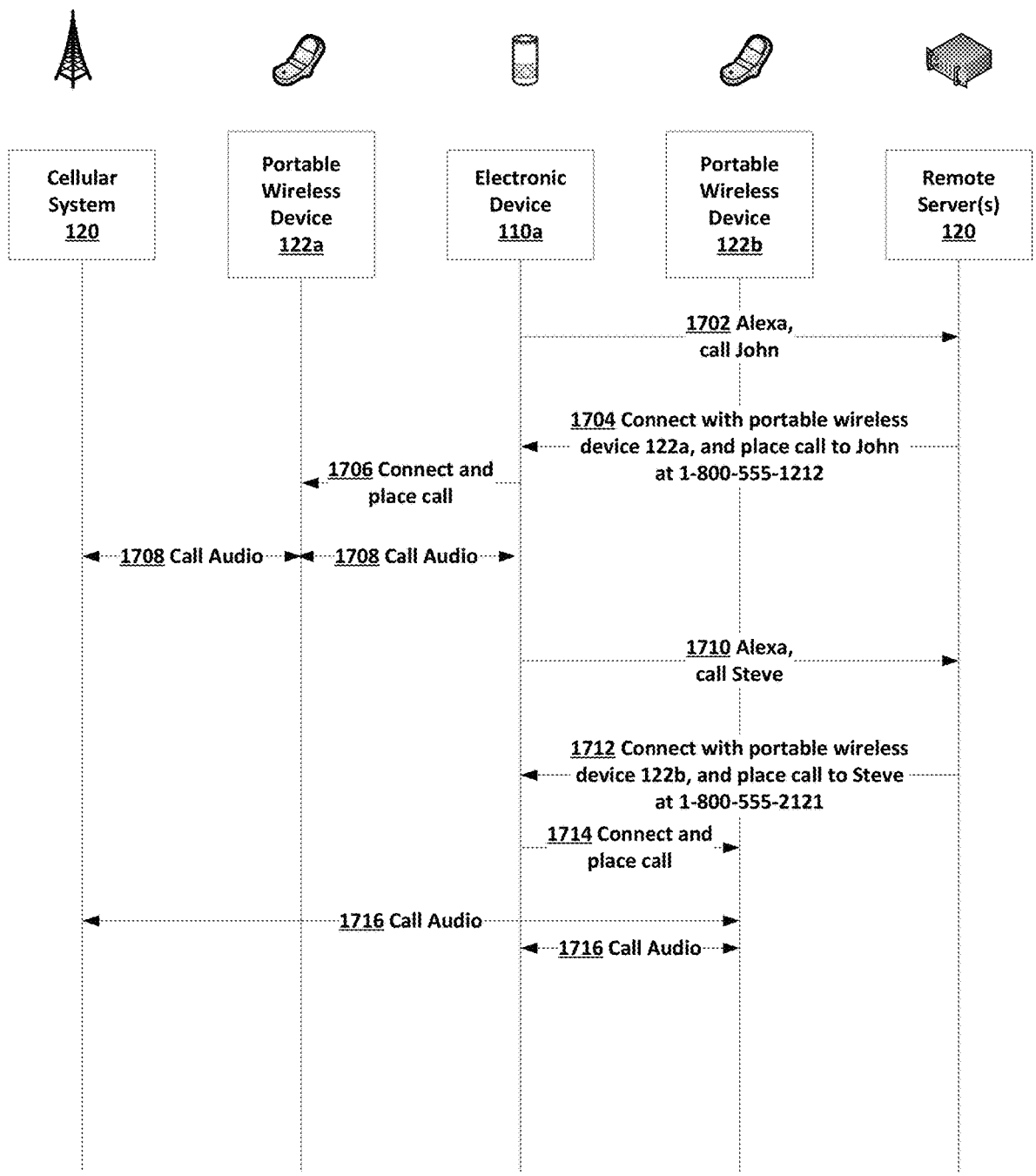
FIG. 17 shows an illustrative process of making an outgoing communication using a plurality of devices.

It is also possible that two portable wireless devices 122a and 122b are both used in the same environment, and that environment has only one electronic device 110a. The system may only allow one portable wireless device 122 to be connected to electronic device 110a at any given time. FIG. 17 illustrates use of two portable wireless device 122a and 122b, with a single electronic device 110a to place outgoing communications.

At 1702, electronic device 110a receives a verbal instruction to call a first entity. That instruction is transmitted from electronic device 110a to remote server(s) 120.

Using information from the previously described contact databases associated with portable wireless devices 122a and 122b, remote server(s) 120 determines that the first entity is a contact in the contact database of portable wireless device 122a. At 1704, remote server(s) 120 sends commands to electronic device 110a to connect with portable wireless device 122a, and provides information, such as called telephone number, to establish the requested communication with the first entity.

At 1706, electronic device 110a connects with portable wireless device 122a, and provides information, such as the called telephone number, to establish the requested communication with the first entity.

At 1708, portable wireless device 122a established the requested communication, and the communication audio is routed to electronic device 110a. When the communication ends, electronic device 110a terminates the connection with portable wireless device 122a.

At 1710, electronic device 110a receives a verbal instruction to call a second entity. That instruction is transmitted from electronic device 110a to remote server(s) 120.

Using information from contact databases associated with portable wireless devices 122a and 122b, remote server(s) 120 determines that the second entity is a contact in the contact database of portable wireless device 122b. At 1712, remote server(s) 120 sends commands to electronic device 110a to connect with portable wireless device 122b, and provides information, such as called telephone number, to establish the requested communication with the second entity.

At 1714, electronic device 110a connects with portable wireless device 122b, and provides information, such as the called telephone number, to establish the requested communication with the second entity.

At 1716, portable wireless device 122b establishes the requested communication, and the communication audio is routed to electronic device 110a. When the communication ends, electronic device 110a terminates the connection with portable wireless device 122b.

Figure 18:
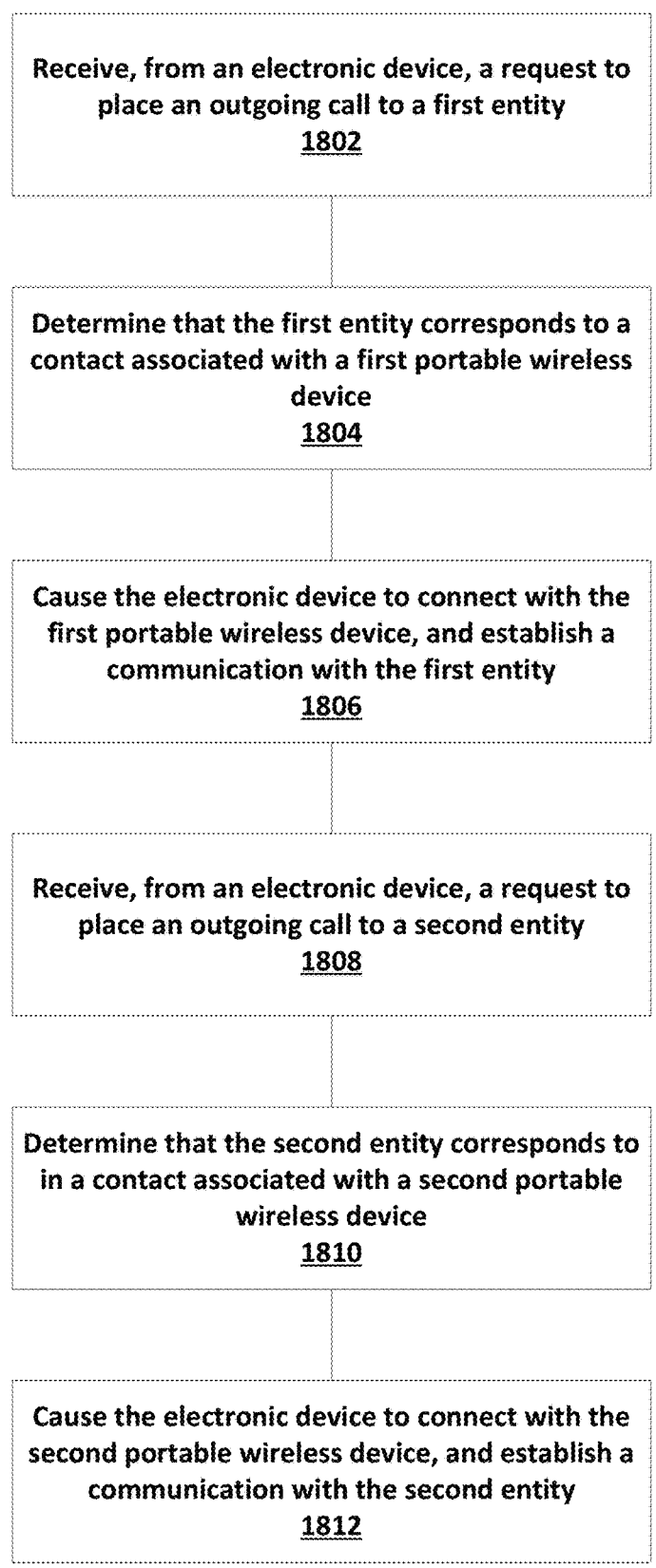
FIG. 18 shows an illustrative process of making an outgoing communication using a plurality of devices.

Referring to FIG. 18, at 1802, the system receives from an electronic device, a request to place an outgoing call to a first entity.

At 1804, the system determines that the first entity corresponds to a contact that is associated with a first portable wireless device.

At 1806, the system causes the electronic device to connect with the first portable wireless device, and establish a communication with the first entity. The connection between the electronic device and the first portable wireless device may be a BLUETOOTH connection.

When the communication is completed the connection between the electronic device and the first portable wireless device is terminated.

At 1808, the system receives, from the electronic device, a request to place an outgoing call to a second entity.

At 1810, the system determines that the second entity corresponds to a contact that is associated with a second portable wireless device.

At 1812, the system causes the electronic device to connect with the second portable wireless device, and establish a communication with the second entity. The connection between the electronic device and the second portable wireless device may be a BLUETOOTH connection.

When the communication is completed the connection between the electronic device and the second portable wireless device is terminated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   one or more processors; and
   memory including computer instructions that, upon execution by the one or more processors, cause the computing system to:
   receive, from a first wireless device, at least first information identifying the first wireless device;
   receive from the first wireless device, at least second information related to an incoming communication to the first wireless device;
   cause a first device to output audio data representing details of the incoming communication;

cause a second device to output audio data representing the details of the incoming communication; and
receive, from the first device, information representing a verbal an instruction to create a communication session for the incoming communication.

2. The computing system of claim 1, wherein the computer instructions further cause the system to:
cause the first wireless device to connect the incoming communication; and
cause the communication session for the incoming communication to be wirelessly sent between the first wireless device and the first device.

3. The computing system of claim 2, wherein the computer instructions further cause the system to:
cause the communication session for the incoming communication to be sent between the first wireless device and the first device using at least a BLUETOOTH connection.

4. The computing system of claim 1, wherein the computer instructions further cause the system to:
receive, from the first wireless device, a first request to identify one of a plurality of devices.

5. The computing system of claim 1, wherein the computer instructions further cause the system to:
cause the first device to activate a first visual indication of the incoming communication; and
cause the second device to activate a second visual indication of the incoming communication.

6. The computing system of claim 1, wherein the computer instructions further cause the system to:
determine, based on user interaction with the first device, an indication of user presence; and
cause the communication session for the incoming communication to be created with the first device based at least on the indication of user presence.

7. The computing system of claim 1, wherein the computer instructions further cause the system to:
determine, using information associated with the first wireless device, identification of a caller associated with the incoming communication; and
include the identification of the caller with the details of the incoming communication.

8. The computing system of claim 1, wherein the computer instructions further cause the system to:
cause a first wireless transmission by the first device;
cause a second wireless transmission by the second device;
receive, from the first wireless device, information related to the second wireless transmission;
cause a communication bridge between the first device and the second device; and
cause the communication session for the incoming communication to be routed between the first wireless device and the first device, using at least the second device.

9. A computer-implemented method, comprising:
receiving, from a first wireless device, at least first information identifying the first wireless device;
receiving from the first wireless device, at least second information related to an incoming communication to the first wireless device;
causing a first device to output audio data representing details of the incoming communication;
causing a second device to output audio data representing the details of the incoming communication; and
receiving, from the first device, information representing a verbal instruction to create a communication session for the incoming communication.

10. The computer-implemented method of claim 9, further comprising:
causing the first wireless device to connect the incoming communication; and
causing the communication session for the incoming communication to be wirelessly sent between the first wireless device and the first device.

11. The computer-implemented method of claim 10, further comprising:
causing the communication session for the incoming communication to be sent between the first wireless device and the first device using at least a BLUETOOTH connection.

12. The computer-implemented method of claim 9, further comprising:
receiving, from the first wireless device, a first request to identify one of a plurality of devices.

13. The computer-implemented method of claim 9, further comprising:
causing the first device to activate a first visual indication of the incoming communication; and
causing the second device to activate a second visual indication of the incoming communication.

14. The computer-implemented method of claim 9, further comprising:
determining, based on user interaction with the first device, an indication of user presence; and
causing the communication session for the incoming communication to be created with the first device based at least on the indication of user presence.

15. The computer-implemented method of claim 9, further comprising:
determining, using information associated with the first wireless device, identification of a caller associated with the incoming communication; and
including the identification of the caller with the details of the incoming communication.

16. The computer-implemented method of claim 9, further comprising:
causing a first wireless transmission by the first device;
causing a second wireless transmission by the second device;
receiving, from the first wireless device, information related to the second wireless transmission;
causing a communication bridge between the first device and the second device; and
causing the communication session for the incoming communication to be routed between the first wireless device and the first device, using at least the second device.

17. A computer-implemented method, comprising:
receiving at least first data representing a first verbal instruction to establish a first communication session with a first entity;
determining that the first entity corresponds to a first wireless device;
causing a first device to establish a first wireless connection with the first wireless device;
causing the first wireless device to establish the first communication session with the first entity;
receiving second data representing a second verbal instruction to establish a second communication session with a second entity;

determining that the second entity corresponds to a second wireless device; and causing the second wireless device to establish the second communication session with the second entity.

18. The computer-implemented method of claim 17, further comprising:

establishing the first wireless connection as a BLUETOOTH connection.

19. The computer-implemented method of claim 17, further comprising:

establishing the first wireless connection as a WiFi connection.

20. The computer-implemented method of claim 17, further comprising:

sending first commands to a second device, the first commands causing the second wireless device and the second device to establish a point-to-point wireless connection; and sending second commands causing a communication bridge between the first device and the second device.

* * * * *